(12) United States Patent
Miao

(10) Patent No.: US 11,770,848 B2
(45) Date of Patent: Sep. 26, 2023

(54) TECHNIQUES FOR UPLINK CANCELLATION INDICATION SIGNALING

(71) Applicant: Intel Corporation, Santa Clara, CA (US)

(72) Inventor: Honglei Miao, Munich (DE)

(73) Assignee: Intel Corporation, Santa Clara, CA (US)

(*) Notice: Subject to any disclaimer, the term of this patent is extended or adjusted under 35 U.S.C. 154(b) by 168 days.

(21) Appl. No.: 17/117,818

(22) Filed: Dec. 10, 2020

(65) Prior Publication Data

US 2021/0100012 A1  Apr. 1, 2021

Related U.S. Application Data

(60) Provisional application No. 62/953,784, filed on Dec. 26, 2019, provisional application No. 62/946,702, filed on Dec. 11, 2019.

(51) Int. Cl.
*H04W 72/12* (2023.01)
*H04W 72/566* (2023.01)
*H04W 72/23* (2023.01)

(52) U.S. Cl.
CPC ......... *H04W 72/569* (2023.01); *H04W 72/23* (2023.01)

(58) Field of Classification Search
CPC ... H04L 5/0007; H04L 5/0023; H04L 5/0048; H04L 5/0051; H04L 5/0064; H04L 5/0094; H04W 72/56; H04W 72/569; H04W 72/23; H04W 72/1268; H04W 72/042; H04W 72/1289
USPC ............................. 370/328, 329, 330, 331
See application file for complete search history.

(56) References Cited

U.S. PATENT DOCUMENTS

| 10,735,240 | B2 * | 8/2020 | Shapin | H04W 72/044 |
|---|---|---|---|---|
| 2020/0092880 | A1 * | 3/2020 | Choi | H04W 72/23 |
| 2020/0137736 | A1 * | 4/2020 | Du | H04L 5/0053 |
| 2020/0367278 | A1 * | 11/2020 | Hosseini | H04L 5/0064 |

FOREIGN PATENT DOCUMENTS

| EP | 2429254 A1 * | 3/2012 | H04W 24/02 |
|---|---|---|---|
| GB | 2576217 A * | 2/2020 | H04W 72/04 |
| WO | WO-2017088783 A1 * | 6/2017 | H04L 1/00 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 527pages.

3Gpp, "3rd Generation Partnership Project; Technical Specification Group Radio Access Network; NR; Medium Access Control (MAC) protocol specification (Release 15)", 3GPP TS 38.321 V15.7.0, Sep. 2019, 78 pages.

(Continued)

*Primary Examiner* — David Q Nguyen
(74) *Attorney, Agent, or Firm* — Schwabe, Williamson & Wyatt, P.C.

(57) ABSTRACT

Various embodiments herein provide techniques to configure different time/frequency region (TFR) configuration schemes for physical uplink shared channel (PUSCH) cancellation indication (CI) signaling. Additionally, embodiments provide techniques to configure different payload construction method (PCM) schemes for PUSCH CI signaling. Other embodiments may be described and claimed.

19 Claims, 13 Drawing Sheets

(56) References Cited

OTHER PUBLICATIONS

3GPP, "3rd Generation Partnership Project; Technical Specification Group Radio Access Network; NR; Multiplexing and channel coding (Release 15)", 3GPP TS 38.212 V15.7.0, Sep. 2019, 101 pages.
3GPP, "3rd Generation Partnership Project; Technical Specification Group Radio Access Network; NR; Physical layer procedures for control (Release 15)", 3GPP TS 38.213 V15.6.0, Jun. 2019, 107 pages.

* cited by examiner

```
UplinkCancellationResource ::=           SEQUENCE {
    timeRegionStartSymbolforCI           ENUMERATED {10S, 20S, 30S, 40S},
    timeDurationforCI                    ENUMERATED {20S, 40S, 70S, 140S, 2Slot, 4Slot},
    timeGranularityforCI                 ENUMERATED {10S, 20S, 40S, 70S, 140S, 280S},
    frequencyRegionforCI                 INTEGER (0..37949),
    nrofFrequencyChunksforCI             ENUMERATED {1, 2, 4, 8},
    ...
}

CI-ConfigurationPerServingCell ::= SEQUENCE {
    servingCellId                 ServCellIndex,
    suiIndicator                  ENUMERATED {0, 1}
    positionInDCI                 INTEGER (0..maxCI-DCI-PayloadSize-1)
}

UplinkCancellation ::=  SEQUENCE {
    ci-RNTI                       RNTI-Value,
    dci-PayloadSize               INTEGER (0..maxCI-DCI-PayloadSize),
    timeFrequencyRegion           CHOICE {
        dynamic                   SEQUENCE (SIZE (1..4)) OF UplinkCancellationResource
        semiStatic                UplinkCancellationResource
    }
    ci-ConfigurationPerServingCell    SEQUENCE (SIZE (1..maxNrofCIServingCells)) OF CI-
ConfigurationPerServingCell,
    ...
}

PDCCH-Config ::= SEQUENCE {
    ...
    downlinkPreemption         SetupRelease { DownlinkPreemption }  OPTIONAL,    -- Need M
    uplinkCancellation         SetupRelease { UplinkCancellation }  OPTIONAL,    -- Need M
    ...
}
```

Figure 1

| b7 | | | | | | | b0 | |
|---|---|---|---|---|---|---|---|---|
| R | Serving Cell ID | | | | | | BWP ID | Octet-1 |
| R | R | R | S3 | S2 | S1 | S0 | | Octet-1 |

MAC CE for UL CI TFR configuration activation/deactivation

Figure 2

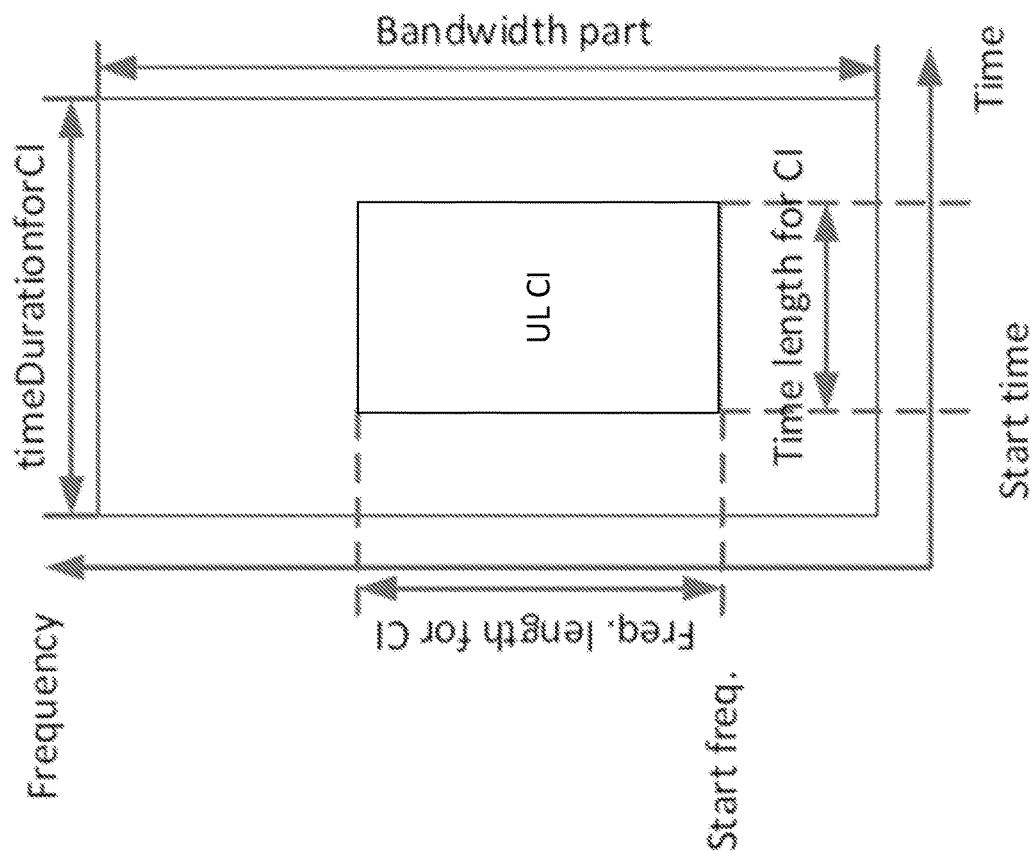

```
UplinkCancellationResource ::=     SEQUENCE {
    timeRegionStartSymbolForCI        ENUMERATED {10s, 20s, 30s, 40s, 50s, 60s, 70s, 80s},
    timeDurationForCI                 ENUMERATED {20s, 40s, 50s, 70s, 140s, 210s, 280s, 410s},
    timeGranularityForCI              ENUMERATED {10s, 20s, 40s, 50s, 70s, 140s, 280s},
    frequencyRegionForCI              INTEGER (0..37949),
    nbrOfFrequencyChunkForCI          ENUMERATED {1, 2, 4, 8},
    payloadConstructionMethod         PayloadConstructionType,
    ...
}

PayloadConstructionType ::= ENUMERATED {2D-bitmap, SubregionBitmapAID, Two-1D}
```

Figure 4

```
CI-ConfigurationPerServingCell ::= SEQUENCE {
    ServingCellId,
    RnIndicator                       ENUMERATED {0, 1},
    positionInDCI                     INTEGER (0..maxCI-DCI-PayloadSize-1)
}

UplinkCancellation ::= SEQUENCE {
    ci-RNTI                           RNTI-Value,
    dci-PayloadSize                   INTEGER (0..maxCI-DCI-PayloadSize),
    timeFrequencySet                  UplinkCancellationResource,
    payloadConstructionMethod         PayloadConstructionType,
    ci-ConfigurationPerServingCell    SEQUENCE (SIZE (1..maxNrofCIServingCells)) OF CI-ConfigurationPerServingCell,
    ...
}
```

Figure 5

```
UplinkCancellation ::=     SEQUENCE {
    ci-RNTI                RNTI-Value,
    dci-PayloadSize        INTEGER (0..maxCI-DCI-PayloadSize),
    timeFrequencySet       UplinkCancellationResource
    payloadConstructionMethod     CHOICE {
        dynamic            SEQUENCE (1..3)) OF PayloadConstructionType
        semiStatic         PayloadConstructionType,
    }
    ci-ConfigurationPerServingCell  SEQUENCE (SIZE (1..maxNrofCIServingCell)) OF CI-
ConfigurationPerServingCell,
}

PUCCH-Config ::=
    ...
    downlinkPreemption  SetupRelease { DownlinkPreemption }   OPTIONAL,   -- Need M
    uplinkCancellation  SetupRelease { UplinkCancellation }   OPTIONAL,   -- Need M
    ...
}
```

Figure 6

TECHNIQUES FOR UPLINK CANCELLATION INDICATION SIGNALING

CROSS REFERENCE TO RELATED APPLICATION

The present application claims priority to U.S. Provisional Patent Application No. 62/946,702, which was filed Dec. 11, 2019; U.S. Provisional Patent Application No. 62/953,784, which was filed Dec. 26, 2019; the disclosures of which are hereby incorporated by reference.

FIELD

Embodiments relate generally to the technical field of wireless communications.

BACKGROUND

In new radio (NR) Rel. 16, physical uplink shared channel (PUSCH) transmission scheme supports downlink control information (DCI) signaled uplink transmission cancellation indication (CI) so that high priority UE can preempt uplink resources which have been already allocated to low priority UE traffic. As a result, the latency critical UE uplink traffic can be prioritized over low priority UE traffic.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates an example of a radio resource control (RRC) message (e.g., PDCCH-Config) including an Uplink-Cancellation information element (IE), in accordance with various embodiments.

FIG. 2 illustrates an example medium access control (MAC) control element (CE) for activation and/or deactivation of uplink (UL) cancellation indication (CI) configurations, in accordance with various embodiments.

FIG. 3 illustrates an example of uplink cancellation resources in accordance with various embodiments.

FIG. 4 illustrates an example of an UplinkCancellation-Resource RRC IE, in accordance with various embodiments.

FIG. 5 illustrates an example of an UplinkCancellation IE, in accordance with various embodiments.

FIG. 6 illustrates a PDCCH-Config RRC message with an UplinkCancellation RRC IE, in accordance with various embodiments.

DETAILED DESCRIPTION

Figure 7:
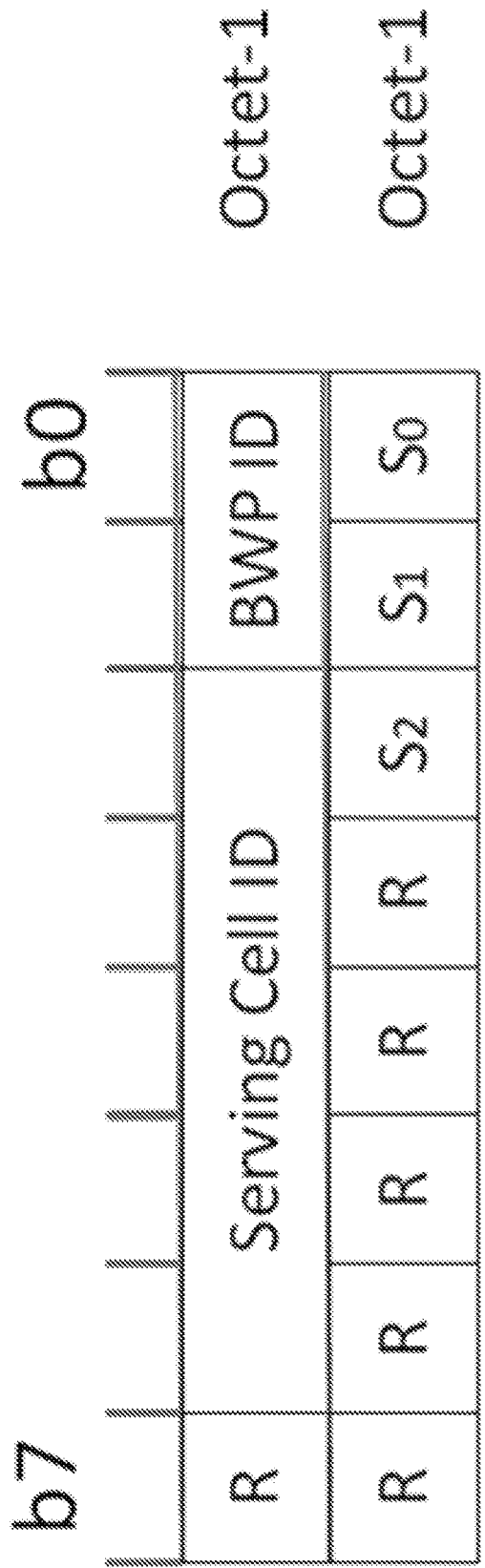
FIG. 7 illustrates a MAC CE for activation and/or deactivation of a UL CI payload construction method (PCM), in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In new radio (NR) Rel. 16, physical uplink shared channel (PUSCH) transmission scheme supports downlink control information (DCI) signaled uplink transmission cancellation indication (CI) so that high priority user equipment (UE) can preempt uplink resources which have been already allocated to low priority UE traffic. As a result, the latency critical UE uplink traffic can be prioritized over low priority UE traffic.

It has been agreed in 3GPP that the maximum monitoring periodicity for DCI signaling UL CI is 5 slots, and UE is not expected to be configured with search space configuration for UL CI with aggregation level (AL) and number of candidates exceeding a specified limit on blind decodings. RRC parameter timedurationforCI is specified for configuring the time duration for UL transmission CI. Specifically, if the configured UL CI monitoring periodicity is >1 slot or 1-slot with only one monitoring occasion, at least timedurationforCI is the same as the configured UL CI monitoring periodicity. 16 possible values, e.g., {1, 2, 4, 5, 7, 8, 10, 14, 16, 20, 25, 28, 32, 35, 56, 112} in terms of OFDM symbols (OS), can be supported for RRC parameter CI-PayloadSize defining the payload size for each CI. RRC parameter timeGranularityforCI is defined as number of partitions within the time region, and possible values are {1, 2, 4, 7, 14, 28} OSs. The configured value of CI-PayloadSize shall be a multiple integer of the configured value of timeGranularityforCI. The frequency region for UL CI is derived by the a resource indicator value (MV) indication configured by RRC [1] within value range of (0 . . . 37949) (e.g. the same way as IE "locationAndBandwidth" for BWP configuration), the configuration is per serving cell specific.

Accordingly, the RRC parameters CI-PayloadSize, timedurationforCI, timeGranularityforCI and frequencyRegionforCI can be configured per serving cell. 2D-bitmap can be used to configure the time frequency region for UL CI. Specifically, 2D-bitmap is to use X bits for bitmap indication over a time/frequency region with M partitions in time and N partitions in frequency, and X=M×N.

Additionally, the RRC parameters CI-PayloadSize, timedurationforCI, timeGranularityforCI and frequencyRegionforCI can be configured per serving cell. 2D-bitmap can be used as a payload construction method (PCM) to signal the time frequency region for UL CI. Specifically, 2D-bitmap is to use X bits for bitmap indication over a time/frequency region with M partitions in time and N partitions in frequency, and $X=M \times N$.

Embodiments herein provide signalling methods to configure different time/frequency region (TFR) configuration schemes for PUSCH CI signaling. Specifically, semi-static and/or dynamic TFR configuration methods can be configured by RRC signaling. In case of dynamic TFR configuration, downlink control information (DCI) signalling UL CI can indicate the chosen TFR configuration among those configured ones. Moreover, the described MAC CE enables gNB to more dynamically activate a subset of configured TFR configurations. As a result, the required DCI overhead signalling TFR configuration can also be reduced.

Additionally, embodiments herein provide enhanced signalling methods to configure different PCM schemes for PUSCH CI signaling. Specifically, semi-static and/or dynamic PCM signaling methods may be configured by RRC signaling. In case of dynamic PCM signaling, downlink control information (DCI) signalling UL CI can indicate the chosen PCM among those configured ones. Moreover, the proposed MAC CE enables gNB to more dynamically activate a subset of configured PCM schemes. As a result, the required DCI overhead signalling PCM can also be further reduced.

Configuration of Time-Frequency Region (TFR) Schemes for Uplink (UL) Cancellation Indication (CI)

Embodiments include the following methods to configure and signal the TFR scheme for UL CI in more dynamic and flexible manner. Aspects of the embodiments may be used in combination and/or separately.

Method-1: Enhanced RRC configuration for uplink transmission cancellation indication signaling. In this method, time-frequency resource set (TFRS) for PUSCH transmission cancellation indication (CI) signaling can be configured by RRC signaling to UE. Moreover, both semi-static and dynamic TFRS can be supported. For semi-static TFRS, only a particular TFRS method is configured by RRC signaling, and UE shall apply the configured TFRS for PUSCH CI signaling. In case of a dynamic TFRS, several TFRSs can be configured by RRC signaling to the UE. And DCI can dynamically signal a particular TFRS setting among configured ones to UE for PUSCH CI signaling. As a result, both semi-static and dynamic TFRS configuration can be supported for PUSCH CI signaling. Specifically, RRC information element (IE) UplinkCancellation can be added to PDCCH-Config in TS 38.331 [1].

Method-2: MAC CE for TFR configuration activation/deactivation. In this method, a set of TFR configurations, namely timeFrequencySetList, is first configured to the UE by RRC IE UplinkCancellation in PDCCH-Config to enable a number of TFR configurations to be further activated or deactivated for DCI UL CI signaling. A MAC control element (CE) can be added to TS 38.321 [2] to signal UE to activate/deactivate some of TFR configurations in UplinkCancellation in PDCCH-Config. If only one TFR configuration is activated at a time, the activated TFR configuration shall be applied. If multiple TFR configurations are activated for a given time period, DCI shall further signal which particular TFR configuration among the activated ones to be used for the current DCI UL CI signaling.

Method-3: dynamic DCI signalling TFR for UL cancellation indication. In this method, TFR field in DCI signalling UL CI can be added to signal a particular TFR configuration included in timeFrequencySet set as dynamic configured in UplinkCancellation of PDCCH-Config in Method-1, or activated by MAC CE in Method-2.

The signaling methods described herein enable gNB to configure different TFR configuration schemes for PUSCH CI signaling. Specifically, both semi-static and dynamic TFR configuration methods can be configured by RRC signaling. In case of dynamic TFR configuration, downlink control information (DCI) signaling UL CI can indicate the chosen TFR configuration among those configured ones. Moreover, the proposed MAC CE enables gNB to more dynamically activate a subset of configured TFR configurations. As a result, the required DCI overhead signaling TFR configuration can also be reduced. The signaling methods for TFR configuration schemes are described further below.

Method-1: Enhanced RRC Configuration for Uplink Transmission Cancellation Indication Signaling In this method, time-frequency resource set (TFRS) for PUSCH transmission cancellation indication (CI) signaling can be configured by RRC signaling to UE. Moreover, both semi-static and dynamic TFRS can be supported. For semi-static TFRS, only a particular TFRS method is configured by RRC signaling, and UE shall apply the configured TFRS for PUSCH CI signaling. In case of a dynamic TRFS, several TFRSs can be configured by RRC signaling to the UE. And DCI can dynamically signal a particular TFRS setting among configured ones to UE for PUSCH CI signaling. As a result, both semi-static and dynamic TRRS configuration can be supported for PUSCH CI signaling. Specifically, RRC information element (IE) UplinkCancellation can be added to PDCCH-Config in TS 38.331 [1] as shown in FIG. 1.

The parameters in FIG. 1 may be defined as follows in some embodiments:

UplinkCancellationResource defines a new type used for uplink cancellation resource configuration. Specifically, it includes the following parameters:

timeRegionStartSymbolforCI: defines the start symbol of the reference time region which corresponds to X symbols after the ending symbol of the physical downlink control channel (PDCCH) control resource set (CORESET) carrying the UL CI, where X is at least equal to the minimum processing time for UL cancelation, and xOS refers to x OFDM symbol.

timeDurationforCI: defines the time duration of the reference time region, where xOS refers to x OFDM symbols, and ySlot refers to y slots.

timeGranularityforCI: defines the time granularity of the reference time region.

frequencyRegionforCI: defines the reference frequency region for UL CI signaling, which is signaled by the resource indicator value (RIV) calculated in 3GPP TS 38.213 [4].

nbrofFrequencyChunksforCI: defines the number of frequency chunks in the reference frequency region for UL CI signaling.

CI-ConfigurationPerServingCell defines a new type used for serving cell/carrier configuration for UL CI signaling. Specifically, it includes the following parameters:

servingCellId: defines the ID of the serving cell where UL cancellation is applied.

sulIndicator: indicates whether the CI configuration is for the normal UL or SUL carrier of the serving cell.

positionInDCI: defines the position of UL CI payload located in the UL CI DCI.

A new parameter named as uplinkCancellation of type UplinkCancellation can be added to RRC IE PDCCH-Config. Specifically, UplinkCancellation includes the following parameters:

ci-RNTI: defines the RNTI value used for UE to monitor the DCI signaling UL CI.

dci-PayloadSize: defines the payload size of the DCI signaling UL CI which is equal to the total UL CI payloads of all UL serving cells/carriers supporting UL CI.

timeFrequencySet: defines the reference time-frequency region (TFR) configuration for UL CI signaling, which can be set as either dynamic or semi-static.

When set to dynamic, a list of TFR configurations of type UplinkCancellationResource are defined. The code-point of each configured TFR shall be used in DCI CI signaling to indicate which particular TFR configuration shall be used in the DCI CI signaling.

When set to semi-static, a particular TFR configuration shall be defined for timeFrequencySet. The configured TFR shall be used for the DCI CI signaling.

ci-configurationPerServingCell defines the list of serving cell configurations being signalled by DCI UL CI.

Method-2: MAC CE for TFR Configuration Activation/Deactivation

In this method, a set of TFR configurations, namely timeFrequencySetList, is first configured to the UE by RRC IE UplinkCancellation in PDCCH-Config to enable a number of TFR configurations to be further activated or deactivated for DCI UL CI signaling. A MAC control element (CE) can be added to 3GPP TS 38.321 to signal UE to activate/deactivate some of TFR configurations in UplinkCancellation in PDCCH-Config. If only one TFR configuration is activated at a time, the activated TFR configuration shall be applied. If multiple TFR configurations are activated for a given time period, DCI shall further signal which particular TFR configuration among the activated ones to be used for the current DCI UL CI signaling.

A set of TFR configurations for PUSCH transmission can be configured by RRC IE UplinkCancellation in PDCCH-Config as follows:

UplinkCancellation::=SEQUENCE {
...
    timeFrequencySetList SEQUENCE (SIZE (1 . . . 4))
        OF UplinkCancellationResource
...
}
where
Type UplinkCancellationResource is defined as in Method-1.

Parameter timeFrequencySetList defines a list of TFR configurations which can be further activated or deactivated by MAC CE.

The UL CI TFR Activation/Deactivation MAC CE can be identified by a MAC subheader with LCID as specified in 3GPP TS 38.321 (Release 15). As illustrated in FIG. 2, it may have a fixed size of 16 bits with following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [3]. The length of the BWP ID field is 2 bits;

$S_i$: If there is a UL CI TFR configuration included in timeFrequencySetList in UplinkCancellation of PDCCH-Config as specified in TS 38.331 [1], configured for the downlink bandwidth part indicated by BWP ID field, $S_i$ indicates the activation status of UL CI TFR configured in timeFrequencySetList equal to i+1, otherwise MAC entity shall ignore this field. The $S_i$ field is set to 1 to indicate UL CI TFR configured in timeFrequencySetList equal to i+1 shall be activated. The $S_i$ field is set to 0 to indicate UL CI TFR configured in timeFrequencySetList equal to i+1 shall be deactivated. One or several UL CI TFR configurations can be active at a time;

R: Reserved bit, set to 0

Method-3: Dynamic DCI Signalling TFR for UL Cancellation Indication.

In this method, TFR field in DCI signalling UL CI can be added to signal a particular TFR configuration included in timeFrequencySet set as dynamic configured in UplinkCancellation of PDCCH-Config in Method-1, or activated by MAC CE in Method-2. Specifically, TFR field can be defined as follows:

TFR indication flag—0, 1 or 2 bits:
  0 bit according to Table 1, if timeFrequencySet is set to semiStatic in Method-1, or only one TFR configuration is activated at a given time by MAC CE in Method-2.
  1 bit according to Table 1, if timeFrequencySet is set to dynamic with two configured UplinkCancellationResource settings in Method-1, or two timeFrequencySets are activated at a given time by MAC CE in Method-2.
  2 bit according to Table 2, if timeFrequencySet is set to dynamic with four configured UplinkCancellationResource settings in Method-1, or four timeFrequencySets are activated at a given time by MAC CE in Method-2.

TABLE 1

TFR configuration indication (1 bit)

| Bit field mapped to index | TFR configuration for CI |
| --- | --- |
| 0 | The 1st configured or activated TFR configuration is used |
| 1 | The 2nd configured or activated TFR configuration is used |

TABLE 2

TFR configuration indication (2 bits)

| Bit field mapped to index | TFR configuration for CI |
| --- | --- |
| 00 | The 1st configured or activated TFR configuration is used |
| 01 | The 2nd configured or activated TFR configuration is used |
| 10 | The 3rd configured or activated TFR configuration is used |
| 11 | The 4th configured or activated TFR configuration is used |

Techniques for Configuring PCM Schemes

Embodiments include following methods to configure and signal the PCM schemes for PUSCH CI signaling in more dynamic and flexible manner. Aspects of the embodiments may be used in combination and/or separately.

Method-4: Enhanced UL Transmission Cancellation Indication Payload Construction.

In this method, 2D time-frequency resource cancellation indication (CI) signaling can be extended to consist of two 1-D resource indication signalings, e.g., time-domain resource indication signaling and frequency-domain resource indication signaling. Each 1-D resource indication signaling contains the resource indicator value (RIV) calculated in 3GPP TS 38.213 which combines the starting position and length of the allocated resources into a single number. As a result, the UL CI payload can be constructed by time-domain RIV followed by frequency-domain RIV.

Method-5: Enhanced RRC Configuration for Uplink Transmission Cancellation Indication Signaling.

In this method, payload construction method (PCM) for PUSCH transmission cancellation indication (CI) signaling can be configured by RRC signaling to UE. Moreover, both semi-static and dynamic PCM can be supported. For semi-static PCM, only a particular PCM method is configured by RRC signaling, and UE shall apply the configured PCM for UL CI payload construction. In case of a dynamic PCM, DCI can be used to dynamically choose a particular PCM out of the three PCMs in Method-1 for UL CI payload construction. As a result, both semi-static and dynamic PCM configuration can be supported for PUSCH CI signaling. Specifically, RRC information element (IE) UplinkCancellation can be added to PDCCH-Config in 3GPP TS 38.331.

Method-6: MAC CE for PCM Configuration Activation/Deactivation.

In this method, a set of PCMs, namely payloadConstructionMethodList, is first configured to the UE by RRC IE UplinkCancellation in PDCCH-Config to enable a number of PCM methods to be further activated or deactivated for DCI UL CI signaling. A MAC control element (CE) can be added to 3GPP TS 38.321 to signal UE to activate/deactivate some of PCM methods in UplinkCancellation in PDCCH-Config. If only one PCM is activated at a time, the activated PCM shall be applied. If multiple PCMs are activated for a given time period, DCI shall further signal which particular PCM among the activated ones to be used for the current DCI UL CI signaling.

Method-7: Dynamic DCI Signalling PCM for UL Cancellation Indication.

In this method, PCM field in DCI signalling UL CI can be added to signal a particular PCM when payloadConstructionMethod is set as dynamic in UplinkCancellation of PDCCH-Config in Method-2 or activated by MAC CE in Method-6.

The proposed enhanced signalling methods enables gNB to configure different PCM schemes for PUSCH CI signaling. Specifically, both semi-static and dynamic PCM signaling methods can be configured by RRC signaling. In case of dynamic PCM signaling, downlink control information (DCI) signalling UL CI can indicate the chosen PCM among those configured ones. Moreover, the proposed MAC CE enables gNB to more dynamically activate a subset of configured PCM schemes. As a result, the required DCI overhead signalling PCM can also be further reduced. Various aspects of the disclosed methods are described in further detail below.

Method-4: Enhanced UL Transmission Cancellation Indication Payload Construction

In this method, 2D time-frequency resource cancellation indication (CI) signaling can consist of two 1-D resource indication signalings, e.g., time-domain resource indication signaling and frequency-domain resource indication signaling. Each 1-D resource indication signaling contains the resource indicator value (RIV) calculated in TS 38.213 [4] which combines the starting position and length of the allocated resources into a single number. As a result, the UL CI payload can be constructed by time-domain RIV followed by frequency-domain RIV. This method is particularly useful for signaling the resources allocated in rectangle shape as illustrated in FIG. 3. Time-frequency region is typically comprised of several subregions in time domain, each of which consists of one or several OFDM symbols, defined by time-domain granularity, namely timeDomainGranularityforCI, in uplink cancellation resource RRC information element (IE) UplinkCancellationResource. In general two 1-D resource indication signaling has considerably smaller payload size than multiple concatenated per-subregion 1-D resource signaling and 2D-bitmap used in the current uplink cancellation signaling method. Specifically, for UL CI payload construction, the following two options can be employed.

Option-1: Enhanced Uplink Cancellation Resource RRC Configuration.

In this option, the RRC IE UplinkCancellationResource can be defined as shown in FIG. 4. In some embodiments, the parameters of the UplinkCancellationResource IE may be defined as follows:

- timeRegionStartSymbolforCI: defines the start symbol of the reference time region which corresponds to X symbols after the ending symbol of the physical downlink control channel (PDCCH) control resource set (CORESET) carrying the UL CI DCI (downlink control information), where X is at least equal to the minimum processing time for UL cancelation, and xOS refers to x OFDM symbol.
- timeDurationforCI: defines the time duration of the reference time region, where xOS refers to x OFDM symbols, and ySlot refers to y slots.
- timeGranularityforCI: defines the time granularity of the reference time region, e.g., time duration of each subregion.
- frequencyRegionforCI: defines the reference frequency region for UL CI signaling, which is signaled by the resource indicator value (MV) calculated in TS 38.213 [4].
- nbrofFrequencyChunksforCI: defines the number of frequency chunks in the reference frequency region for UL CI signaling.
- payloadConstructionType: defines the type for UL CI payload construction method. And it is enumerated type comprised of three values: 2D-bitmap, SubregionBased1D and Two-1D.
  - payloadConstructionMethod: When it is set to "2D-bitmap", the current 2D-bitmap method is used. When it is set to "SubregionBased1D", the per-subregion (defined by time-granularity) independent frequency-domain MV signaling is used. When it is set to "Two-1D", the UL CI payload is constructed by two RIVs, e.g., time-domain MV followed by frequency-domain RIV.

Option-2: Enhanced Uplink Cancellation RRC Configuration

In this option, RRC configuration UplinkCancellation can be enhanced as shown in FIG. 5. In some embodiments, the parameters of the UplinkCancellation IE may be defined as follows:

UplinkCancellationResource is defined as Option-1 except that parameter payloadConstructionMethod is absent.

CI-ConfigurationPerServingCell defines a new type used for serving cell/carrier configuration for UL CI signaling. Specifically, it includes the following parameters:
  servingCellId: defines the ID of the serving cell where UL cancellation is applied.
  sulIndicator: indicates whether the CI configuration is for the normal UL or SUL carrier of the serving cell.
  positionInDCI: defines the position of UL CI payload located in the UL CI DCI.

A new parameter named as uplinkCancellation of type UplinkCancellation can be added to RRC IE PDCCH-Config. Specifically, UplinkCancellation includes the following parameters:
  ci-RNTI: defines the RNTI value used for UE to monitor the DCI signaling UL CI.
  dci-PayloadSize: defines the payload size of the DCI signaling UL CI which is equal to sum of total UL CI payloads of all UL serving cells/carriers supporting UL CI.
  timeFrequencySet: defines the reference time-frequency region (TFR) configuration for UL CI signaling based on UplinkCancellationResource.
  payloadContrutionMethod: defines the type of UL CI payload construction method to be used as in option-1.
  ci-configurationPerServingCell defines the list of serving cell configurations being signalled by DCI UL CI.

Method-5: Enhanced RRC Configuration for Uplink Transmission Cancellation Indication Signaling In this method, payload construction method (PCM) for PUSCH transmission cancellation indication (CI) signaling can be configured by RRC signaling to UE. Moreover, both semi-static and dynamic PCM can be supported. For semi-static PCM, only a particular PCM method is configured by RRC signaling, and UE shall apply the configured PCM for UL CI payload construction. In case of a dynamic PCM, DCI can be used to dynamically choose a particular PCM out of the three PCMs in Method-4 for UL CI payload construction. As a result, both semi-static and dynamic PCM configuration can be supported for PUSCH CI signaling.

For example, RRC IE UplinkCancellation can be added to PDCCH-Config in 3GPP TS 38.331 as shown in FIG. 6. In some embodiments, the parameters of the UplinkCancellation IE may be defined as follows:
  UplinkCancellationResource is defined as in Method-4.
  CI-ConfigurationPerServingCell is defined as in Method-4.
  UplinkCancellation is defined as in Method-4 except the following parameter:
    payloadContructionMethod: can be set as either dynamic or semi-static.
      When set to dynamic, a list of PCM of type PayloadConstructionType are defined. The code-point of each configured PCM shall be used in DCI CI signaling to indicate which particular PCM shall be used in the DCI CI signaling.
      When set to semi-static, a particular PCM shall be used for the UL CI payload construction.

Method-6: MAC CE for PCM Configuration Activation/Deactivation

In this method, a set of PCMs, namely payloadConstructionMethodList, is first configured to the UE by RRC IE UplinkCancellation in PDCCH-Config to enable a number of PCM methods to be further activated or deactivated for DCI UL CI signaling. A MAC control element (CE) can be added to 3GPP TS 38.321 to signal UE to activate/deactivate some of PCM methods in UplinkCancellation in PDCCH-Config. If only one PCM is activated at a time, the activated PCM shall be applied. If multiple PCMs are activated for a given time period, DCI shall further signal which particular PCM among the activated ones to be used for the current DCI UL CI signaling.

A set of PCMs for PUSCH transmission can be configured by RRC IE UplinkCancellation in PDCCH-Config as follows.

```
UplinkCancellation ::=              SEQUENCE {
    ...
    payloadConstructionMethodList   SEQUENCE (SIZE (1..3)) OF
PayloadContructionType
    ...
}
``` where

Type PayloadConstructionType is defined as in Method-1.

Parameter payloadConstructionMethodList defines a list of PCMs which can be further activated or deactivated by MAC CE.

The UL CI PCM Activation/Deactivation MAC CE can be identified by a MAC subheader with LCID as specified in 3GPP TS 38.321. As illustrated in FIG. 7, it may have a fixed size of 16 bits with following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in 3GPP TS 38.212. The length of the BWP ID field is 2 bits;

$S_i$: If there is a UL CI PCM included in payloadConstructionMethodList in UplinkCancellation of PDCCH-Config as specified in TS 38.331 [1], configured for the downlink bandwidth part indicated by BWP ID field, $S_i$ indicates the activation status of UL CI PCM configured in payloadConstructionMethodList equal to i+1, otherwise MAC entity shall ignore this field. The $S_i$ field is set to 1 to indicate UL CI PCM configured in payloadConstructionMethodList equal to i+1 shall be activated. The $S_i$ field is set to 0 to indicate UL CI PCM configured in payloadConstructionMethodList equal to i+1 shall be deactivated. One or several UL CI PCMs can be active at a time, R: Reserved bit, set to 0

Method-7: Dynamic DCI Signalling PCM for UL Cancellation Indication.

In this method, PCM field in DCI signalling UL CI can be added to signal a particular PCM when payloadConstructionMethod is set as dynamic in UplinkCancellation of PDCCH-Config in Method-5 or activated by MAC CE in Method-6. Specifically, PCM field can be defined as follows:

PCM indication flag—0, 1 or 2:
  0 bit, if payloadConstructionMethod is set to semiStatic in Method-5, or only one PCM is activated at a given time by MAC CE in Method-6;
  1 bit according to Table 1, if payloadConstructionMethod is set to dynamic with two configured PCM settings in Method-5, or two PCMs are activated at a given time by MAC CE in Method-6;
  2 bit according to Table 2, if payloadConstructionMethod is set to dynamic with three configured PCM settings in Method-5, or three PCMs are activated at a given time by MAC CE in Method-6.

TABLE 3

PCM indication flag (1 bit)

| Bit field mapped to index | Payload construction method |
|---|---|
| 0 | The 1st configured or activated PCM is used |
| 1 | The 2nd configured or activated PCM is used |

TABLE 4

PCM indication flag (2 bit)

| Bit field mapped to index | Payload construction method |
|---|---|
| 00 | The 1st configured or activated PCM is used |
| 01 | The 2nd configured or activated PCM is used |
| 10 | The 3rd configured or activated PCM is used |

Systems and Implementations

Figure 8:
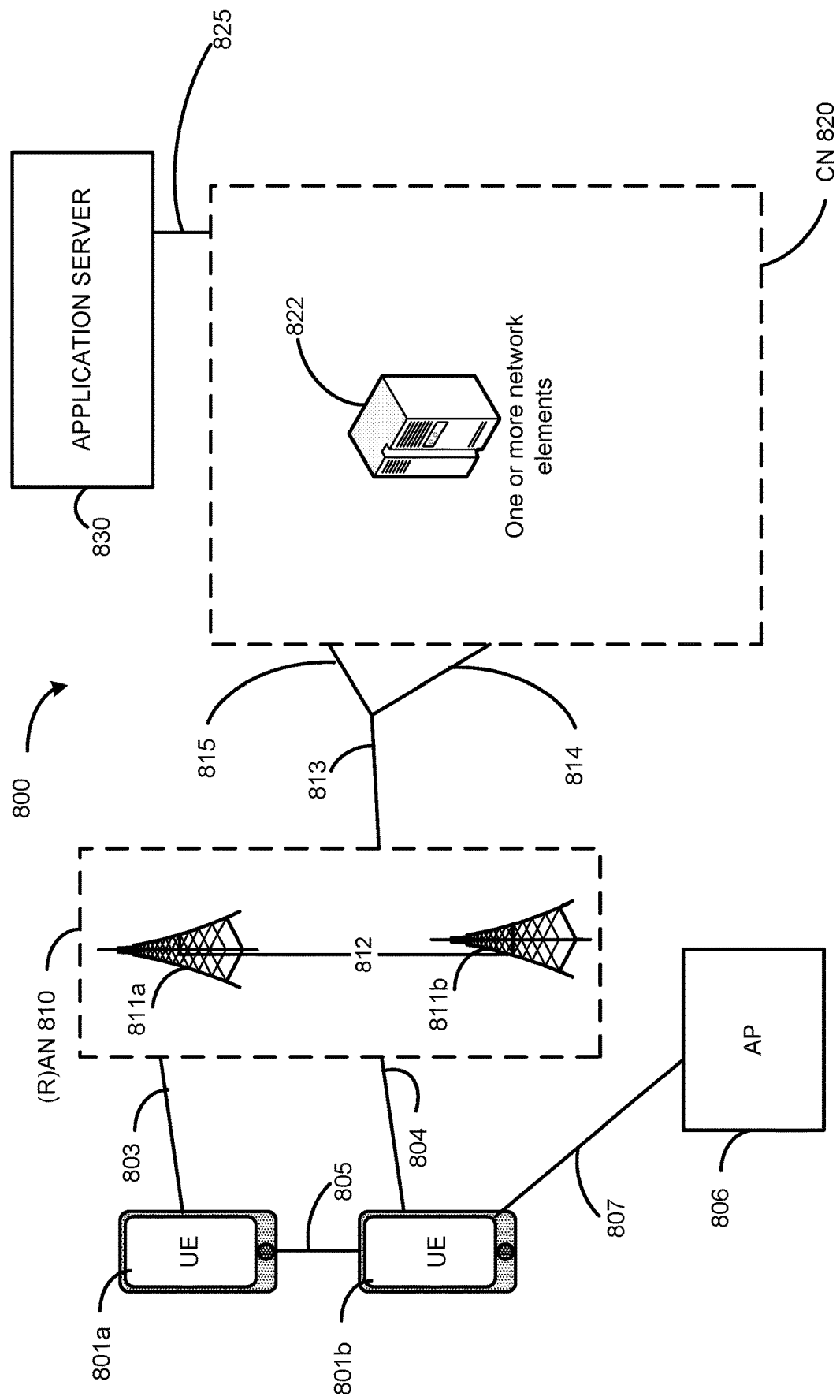
FIG. 8 illustrates an example architecture of a system of a network, in accordance with various embodiments.

FIG. 8 illustrates an example architecture of a system 800 of a network, in accordance with various embodiments. The following description is provided for an example system 800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 8, the system 800 includes UE 801a and UE 801b (collectively referred to as "UEs 801" or "UE 801"). In this example, UEs 801 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 801 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 801 may be configured to connect, for example, communicatively couple, with an or RAN 810. In embodiments, the RAN 810 may be an NG RAN or a 5G RAN, an E-UTRAN, or a legacy RAN, such as a UTRAN or GERAN. As used herein, the term "NG RAN" or the like may refer to a RAN 810 that operates in an NR or 5G system 800, and the term "E-UTRAN" or the like may refer to a RAN 810 that operates in an LTE or 4G system 800. The UEs 801 utilize connections (or channels) 803 and 804, respectively, each of which comprises a physical communications interface or layer (discussed in further detail below).

In this example, the connections 803 and 804 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 801 may directly exchange communication data via a ProSe interface 805. The ProSe interface 805 may alternatively be referred to as a SL interface 805 and may comprise one or more logical channels, including but not limited to a PSCCH, a PSSCH, a PSDCH, and a PSBCH.

The UE 801b is shown to be configured to access an AP 806 (also referred to as "WLAN node 806," "WLAN 806," "WLAN Termination 806," "WT 806" or the like) via connection 807. The connection 807 can comprise a local wireless connection, such as a connection consistent with any IEEE 802.11 protocol, wherein the AP 806 would comprise a wireless fidelity (Wi-Fi®) router. In this example, the AP 806 is shown to be connected to the Internet without connecting to the core network of the wireless system (described in further detail below). In various embodiments, the UE 801b, RAN 810, and AP 806 may be configured to utilize LWA operation and/or LWIP operation. The LWA operation may involve the UE 801b in RRC_CONNECTED being configured by a RAN node 811a-b to utilize radio resources of LTE and WLAN. LWIP operation may involve the UE 801b using WLAN radio resources (e.g., connection 807) via IPsec protocol tunneling to authenticate and encrypt packets (e.g., IP packets) sent over the connection 807. IPsec tunneling may include encapsulating the entirety of original IP packets and adding a new packet header, thereby protecting the original header of the IP packets.

The RAN 810 can include one or more AN nodes or RAN nodes 811a and 811b (collectively referred to as "RAN nodes 811" or "RAN node 811") that enable the connections 803 and 804. As used herein, the terms "access node," "access point," or the like may describe equipment that provides the radio baseband functions for data and/or voice connectivity between a network and one or more users.

These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 811 that operates in an NR or 5G system 800 (for example, a gNB), and the term "E-UTRAN node" or the like may refer to a RAN node 811 that operates in an LTE or 4G system 800 (e.g., an eNB). According to various embodiments, the RAN nodes 811 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 811 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 811; a MAC/PHY split wherein RRC, PDCP, RLC, and MAC layers are operated by the CRAN/vBBUP and the PHY layer is operated by individual RAN nodes 811; or a "lower PHY" split wherein RRC, PDCP, RLC, MAC layers and upper portions of the PHY layer are operated by the CRAN/vBBUP and lower portions of the PHY layer are operated by individual RAN nodes 811. This virtualized framework allows the freed-up processor cores of the RAN nodes 811 to perform other virtualized applications. In some implementations, an individual RAN node 811 may represent individual gNB-DUs that are connected to a gNB-CU via individual F1 interfaces (not shown by FIG. 8). In these implementations, the gNB-DUs may include one or more remote radio heads or RFEMs (see, e.g., FIG. 9), and the gNB-CU may be operated by a server that is located in the RAN 810 (not shown) or by a server pool in a similar manner as the CRAN/vBBUP. Additionally or alternatively, one or more of the RAN nodes 811 may be next generation eNBs (ng-eNBs), which are RAN nodes that provide E-UTRA user plane and control plane protocol terminations toward the UEs 801, and are connected to a 5GC via an NG interface (discussed infra).

In V2X scenarios one or more of the RAN nodes 811 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 801 (vUEs 801). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 811 can terminate the air interface protocol and can be the first point of contact for the UEs 801. In some embodiments, any of the RAN nodes 811 can fulfill various logical functions for the RAN 810 including, but not limited to, radio network controller (RNC) functions such as radio bearer management, uplink and downlink dynamic radio resource management and data packet scheduling, and mobility management.

In embodiments, the UEs 801 can be configured to communicate using OFDM communication signals with each other or with any of the RAN nodes 811 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 811 to the UEs 801, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 801 and the RAN nodes 811 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 801 and the RAN nodes 811 may operate using LAA, eLAA, and/or feLAA mechanisms. In these implementations, the UEs 801 and the RAN nodes 811 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 801 RAN nodes 811, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 801, AP 806, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 801 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 801. The PDCCH carries information about the transport format and resource allocations related to the PDSCH channel, among other things. It may also inform the UEs 801 about the transport format, resource allocation, and HARQ information related to the uplink shared channel. Typically, downlink scheduling (assigning control and shared channel resource blocks to the UE 801b within a cell) may be performed at any of the RAN nodes 811 based on channel quality information fed back from any of the UEs 801. The downlink resource assignment information may be sent on the PDCCH used for (e.g., assigned to) each of the UEs 801.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 811 may be configured to communicate with one another via interface 812. In embodiments where the system 800 is an LTE system (e.g., when CN 820 is an EPC), the interface 812 may be an X2 interface 812. The X2 interface may be defined between two or more RAN nodes 811 (e.g., two or more eNBs and the like) that connect to EPC 820, and/or between two eNBs connecting to EPC 820. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 801 from an SeNB for user data; information of PDCP PDUs that were not delivered to a UE 801; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 800 is a 5G or NR system (e.g., when CN 820 is an 5GC), the interface 812 may be an Xn interface 812. The Xn interface is defined between two or more RAN nodes 811 (e.g., two or more gNBs and the like) that connect to 5GC 820, between a RAN node 811 (e.g., a gNB) connecting to 5GC 820 and an eNB, and/or between two eNBs connecting to 5GC 820. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 810 is shown to be communicatively coupled to a core network—in this embodiment, core network (CN) 820. The CN 820 may comprise a plurality of network elements 822, which are configured to offer various data and telecommunications services to customers/subscribers (e.g., users of UEs 801) who are connected to the CN 820 via the RAN 810. The components of the CN 820 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 820 may be referred to as a network slice, and a logical instantiation of a portion of the CN 820 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 830 may be an element offering applications that use IP bearer resources with the core network (e.g., UMTS PS domain, LTE PS data services, etc.). The application server 830 can also be configured to support one or more communication services (e.g., VoIP sessions, PTT sessions, group communication sessions, social networking services, etc.) for the UEs 801 via the EPC 820.

In embodiments, the CN 820 may be a 5GC (referred to as "5GC 820" or the like), and the RAN 810 may be connected with the CN 820 via an NG interface 813. In embodiments, the NG interface 813 may be split into two parts, an NG user plane (NG-U) interface 814, which carries traffic data between the RAN nodes 811 and a UPF, and the S1 control plane (NG-C) interface 815, which is a signaling interface between the RAN nodes 811 and AMFs.

In embodiments, the CN 820 may be a 5G CN (referred to as "5GC 820" or the like), while in other embodiments, the CN 820 may be an EPC). Where CN 820 is an EPC (referred to as "EPC 820" or the like), the RAN 810 may be connected with the CN 820 via an S1 interface 813. In embodiments, the S1 interface 813 may be split into two parts, an S1 user plane (S1-U) interface 814, which carries traffic data between the RAN nodes 811 and the S-GW, and the S1-MME interface 815, which is a signaling interface between the RAN nodes 811 and MMES.

Figure 9:
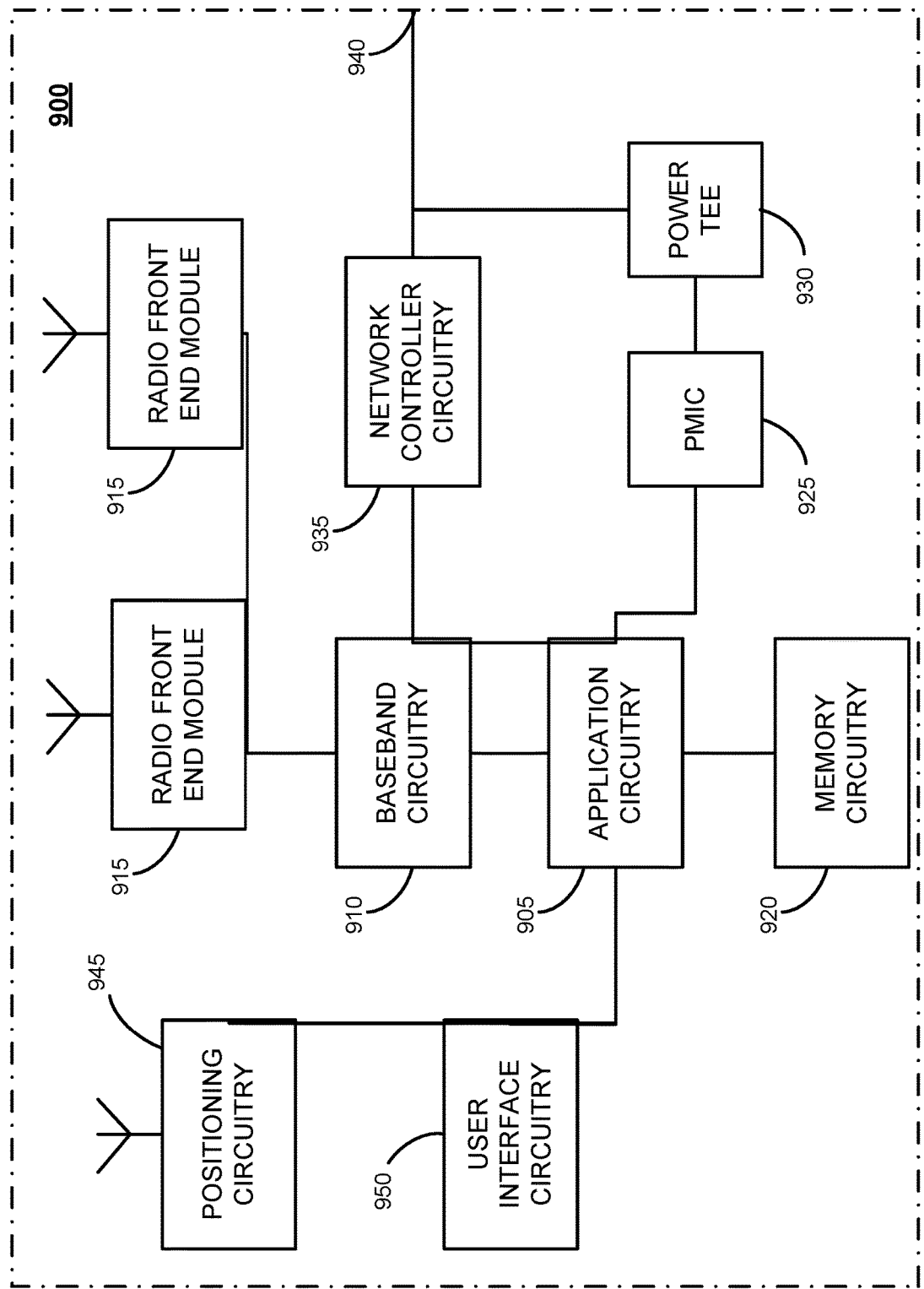
FIG. 9 illustrates an example of infrastructure equipment in accordance with various embodiments.

FIG. 9 illustrates an example of infrastructure equipment 900 in accordance with various embodiments. The infrastructure equipment 900 (or "system 900") may be implemented as a base station, radio head, RAN node such as the RAN nodes 811 and/or AP 806 shown and described previously, application server(s) 830, and/or any other element/device discussed herein. In other examples, the system 900 could be implemented in or by a UE.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, satellite positioning circuitry 945, and user interface 950. In some embodiments, the device 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 910 are discussed infra with regard to FIG. 11.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1111 of FIG. 11 infra), and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various infrastructure (e.g., RAN nodes 811, etc.), or the like.

The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 10:
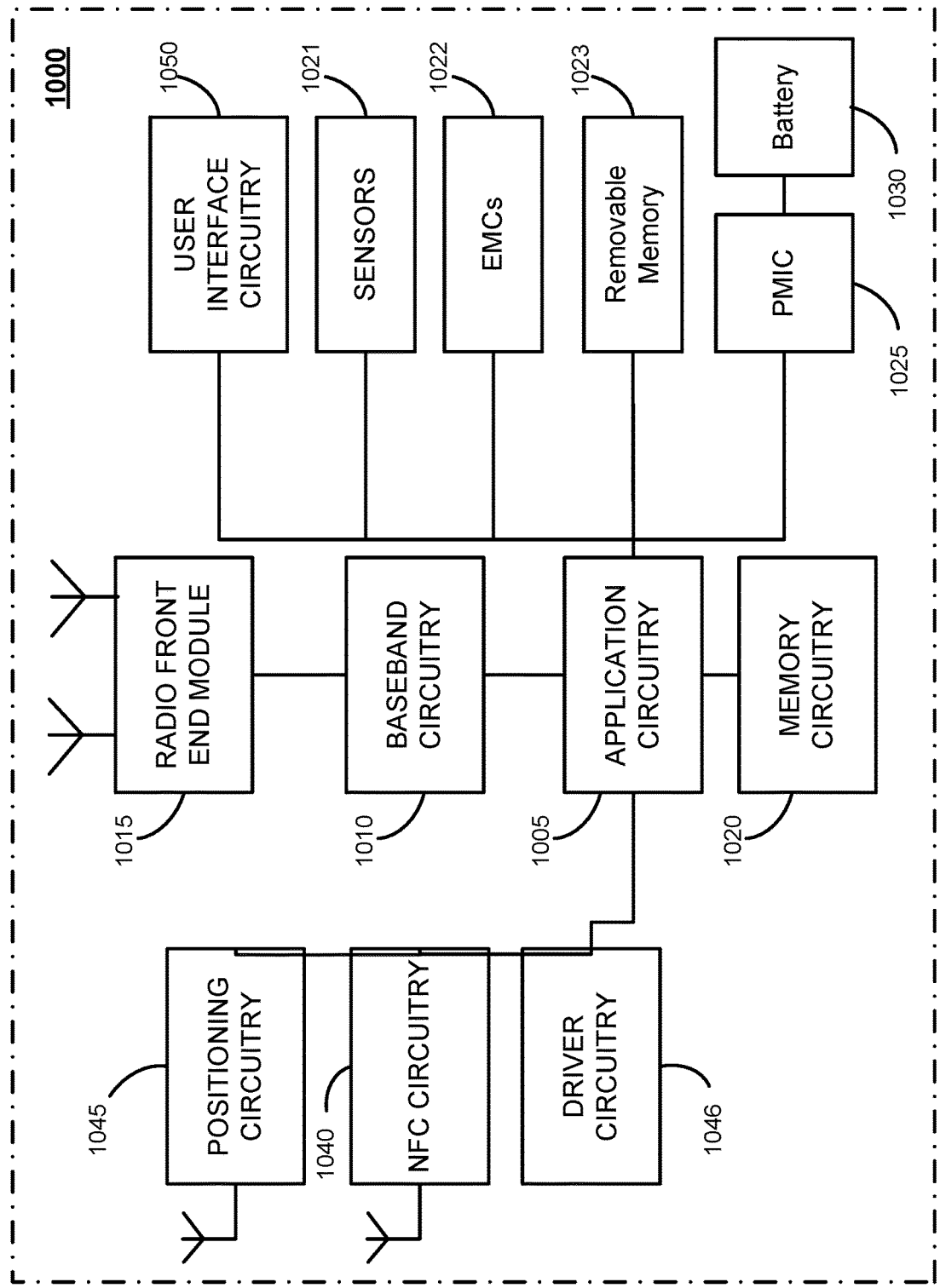
FIG. 10 illustrates an example of a computer platform in accordance with various embodiments.

FIG. 10 illustrates an example of a platform 1000 (or "device 1000") in accordance with various embodiments. In embodiments, the computer platform 1000 may be suitable for use as UEs 801, application servers 830, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1005 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 905 may comprise, or may be, a special-purpose processor/controller to operate according to the various embodiments herein.

As examples, the processor(s) of application circuitry 1005 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1005 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1005 may be a part of a system on a chip (SoC) in which the application circuitry 1005 and other components are formed into a single integrated circuit, or a single package, such as the Edison™ or Galileo™ SoC boards from Intel® Corporation.

Additionally or alternatively, application circuitry 1005 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 11.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1111 of FIG. 11 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include any number and type of memory devices used to provide for a given amount of system memory. As examples, the memory circuitry 1020 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1020 may be developed in accordance with a Joint Electron Devices Engineering Council (JEDEC) low power double data rate (LPDDR)-based design, such as LPDDR2, LPDDR3, LPDDR4, or the like. Memory circuitry 1020 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 may be configured to generate and send messages/signalling to other components of the platform 1000 to indicate a current state of the EMCs 1022. Examples of the EMCs 1022 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1022 based on one or more captured events and/or instructions or control signals received from a service provider and/or various clients.

In some implementations, the interface circuitry may connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-PNT IC that uses a master timing clock to perform position tracking/estimation without GNSS assistance. The positioning circuitry 1045 may also be part of, or interact with, the baseband circuitry 910 and/or RFEMs 1015 to communicate with the nodes and components of the positioning network. The positioning circuitry 1045 may also provide position data and/or time data to the application circuitry 1005, which may use the data to synchronize operations with various infrastructure (e.g., radio base stations), for turn-by-turn navigation applications, or the like In some implementations, the interface circuitry may connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (e.g., an "NFC touchpoint"). NFC circuitry 1040 comprises an NFC controller coupled with an antenna element and a processor coupled with the NFC controller. The NFC controller may be a chip/IC providing NFC functionalities to the NFC circuitry 1040 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1040, or initiate data transfer between the NFC circuitry 1040 and another active NFC device (e.g., a smartphone or an NFC-enabled POS terminal) that is proximate to the platform 1000.

The driver circuitry 1046 may include software and hardware elements that operate to control particular devices that are embedded in the platform 1000, attached to the platform 1000, or otherwise communicatively coupled with the platform 1000. The driver circuitry 1046 may include individual drivers allowing other components of the platform 1000 to interact with or control various input/output (I/O) devices that may be present within, or connected to, the platform 1000. For example, driver circuitry 1046 may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") may manage power provided to various components of the platform 1000. In particular, with respect to the baseband circuitry 1010, the PMIC 1025 may control power-source selection, voltage scaling, battery charging, or DC-to-DC conversion. The PMIC 1025 may often be included when the platform 1000 is capable of being powered by a battery 1030, for example, when the device is included in a UE 801.

In some embodiments, the PMIC 1025 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1030 may power the platform 1000, although in some examples the platform 1000 may be mounted deployed in a fixed location, and may have a power supply coupled to an electrical grid. The battery 1030 may be a lithium ion battery, a metal-air battery, such as a zinc-air battery, an aluminum-air battery, a lithium-air battery, and the like. In some implementations, such as in V2X applications, the battery 1030 may be a typical lead-acid automotive battery.

In some implementations, the battery 1030 may be a "smart battery," which includes or is coupled with a Battery Management System (BMS) or battery monitoring integrated circuitry. The BMS may be included in the platform 1000 to track the state of charge (SoCh) of the battery 1030. The BMS may be used to monitor other parameters of the battery 1030 to provide failure predictions, such as the state of health (SoH) and the state of function (SoF) of the battery 1030. The BMS may communicate the information of the battery 1030 to the application circuitry 1005 or other components of the platform 1000. The BMS may also include an analog-to-digital (ADC) convertor that allows the application circuitry 1005 to directly monitor the voltage of the battery 1030 or the current flow from the battery 1030. The battery parameters may be used to determine actions that the platform 1000 may perform, such as transmission frequency, network operation, sensing frequency, and the like.

A power block, or other power supply coupled to an electrical grid may be coupled with the BMS to charge the battery 1030. In some examples, the power block XS30 may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1030, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1050 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensor circuitry 1021 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
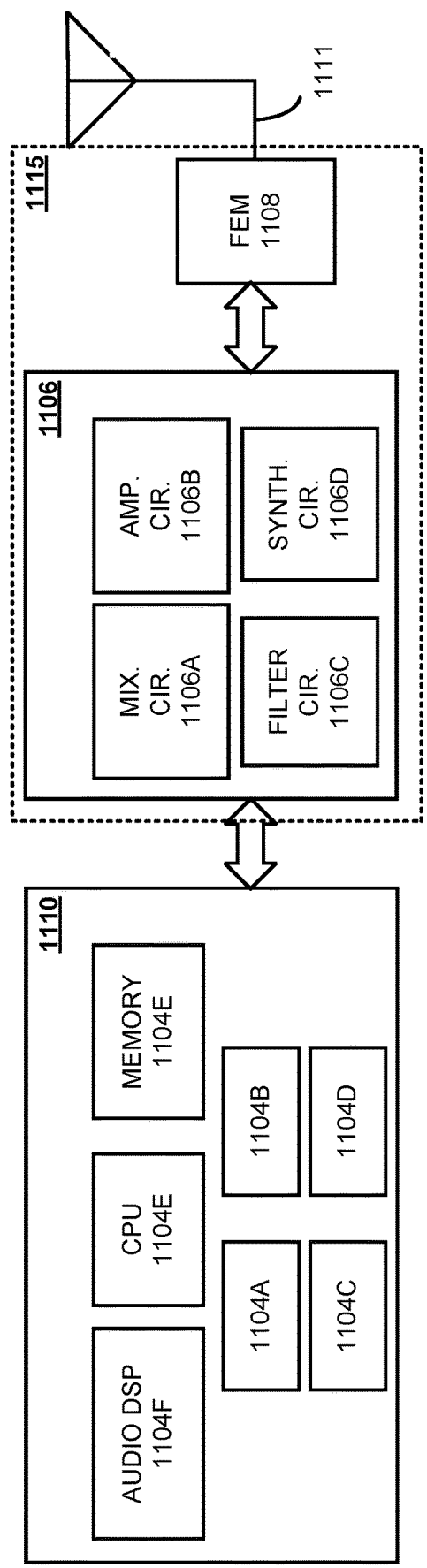
FIG. 11 illustrates example components of baseband circuitry and radio front end modules in accordance with various embodiments.

FIG. 11 illustrates example components of baseband circuitry 1110 and radio front end modules (RFEM) 1115 in accordance with various embodiments. The baseband circuitry 1110 corresponds to the baseband circuitry 910 and 1010 of FIGS. 9 and 10, respectively. The RFEM 1115 corresponds to the RFEM 915 and 1015 of FIGS. 9 and 10, respectively. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1110 may include Fast-Fourier Transform (FFT), precoding, or constellation mapping/demapping functionality. In some embodiments, encoding/decoding circuitry of the baseband circuitry 1110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with application circuitry 905/1005 (see FIGS. 9 and 10) for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other embodiments, some or all of the functionality of baseband processors 1104A-D may be included in modules stored in the memory 1104G and executed via a Central Processing Unit (CPU) 1104E. In other embodiments, some or all of the functionality of baseband processors 1104A-D may be provided as hardware accelerators (e.g., FPGAs, ASICs, etc.) loaded with the appropriate bit streams or logic blocks stored in respective memory cells. In various embodiments, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1110 includes one or more audio digital signal processor(s) (DSP) 1104F. The audio DSP(s) 1104F include elements for compression/decompression and echo cancellation and may include other suitable processing elements in other embodiments.

In some embodiments, each of the processors 1104A-1104E include respective memory interfaces to send/receive data to/from the memory 1104G. The baseband circuitry 1110 may further include one or more interfaces to communicatively couple to other circuitries/devices, such as an interface to send/receive data to/from memory external to the baseband circuitry 1110; an application circuitry interface to send/receive data to/from the application circuitry 905/1005 of FIGS. 9-11); an RF circuitry interface to send/receive data to/from RF circuitry 1106 of FIG. 11; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1025.

In alternate embodiments (which may be combined with the above described embodiments), baseband circuitry 1110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1110 may include protocol processing circuitry with one or more instances of control circuitry (not shown) to provide control functions for the digital baseband circuitry and/or radio frequency circuitry (e.g., the radio front end modules 1115).

Although not shown by FIG. 11, in some embodiments, the baseband circuitry 1110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1110 and/or RF circuitry 1106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1110 and/or RF circuitry 1106 are part of a Wi-Fi communication system. In the second example, the protocol processing circuitry would operate Wi-Fi MAC and logical link control (LLC) functions. The protocol processing circuitry may include one or more memory structures (e.g., 1104G) to store program code and data for operating the protocol functions, as well as one or more processing cores to execute the program code and perform various operations using the data. The baseband circuitry 1110 may also support radio communications for more than one wireless protocol.

The various hardware elements of the baseband circuitry 1110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1110 may be suitably combined in a single chip or chipset, or disposed on a same circuit board. In another example, some or all of the constituent components of the baseband circuitry 1110 and RF circuitry 1106 may be implemented together such as, for example, a system on a chip (SoC) or System-in-Package (SiP). In another example, some or all of the constituent components of the baseband circuitry 1110 may be implemented as a separate SoC that is communicatively coupled with and RF circuitry 1106 (or multiple instances of RF circuitry 1106). In yet another example, some or all of the constituent components of the baseband circuitry 1110 and the application circuitry 905/1005 may be implemented together as individual SoCs mounted to a same circuit board (e.g., a "multi-chip package").

In some embodiments, the baseband circuitry 1110 may provide for communication compatible with one or more radio technologies. For example, in some embodiments, the baseband circuitry 1110 may support communication with an E-UTRAN or other WMAN, a WLAN, a WPAN. Embodiments in which the baseband circuitry 1110 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path, which may include circuitry to down-convert RF signals received from the FEM circuitry 1108 and provide baseband signals to the baseband circuitry 1110. RF circuitry 1106 may also include a transmit signal path, which may include circuitry to up-convert baseband signals provided by the baseband circuitry 1110 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1110 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a of the transmit signal path may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1110 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1110 or the application circuitry 905/1005 depending on the desired output frequency. In some embodiments, a divider control input (e.g., N) may be determined from a look-up table based on a channel indicated by the application circuitry 905/1005.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various embodiments, the amplification through the transmit or receive signal paths may be done solely in the RF circuitry 1106, solely in the FEM circuitry 1108, or in both the RF circuitry 1106 and the FEM circuitry 1108.

In some embodiments, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission by one or more antenna elements of the antenna array 1111.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

Processors of the application circuitry 905/1005 and processors of the baseband circuitry 1110 may be used to execute elements of one or more instances of a protocol stack. For example, processors of the baseband circuitry 1110, alone or in combination, may be used execute Layer 3, Layer 2, or Layer 1 functionality, while processors of the application circuitry 905/1005 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 12:
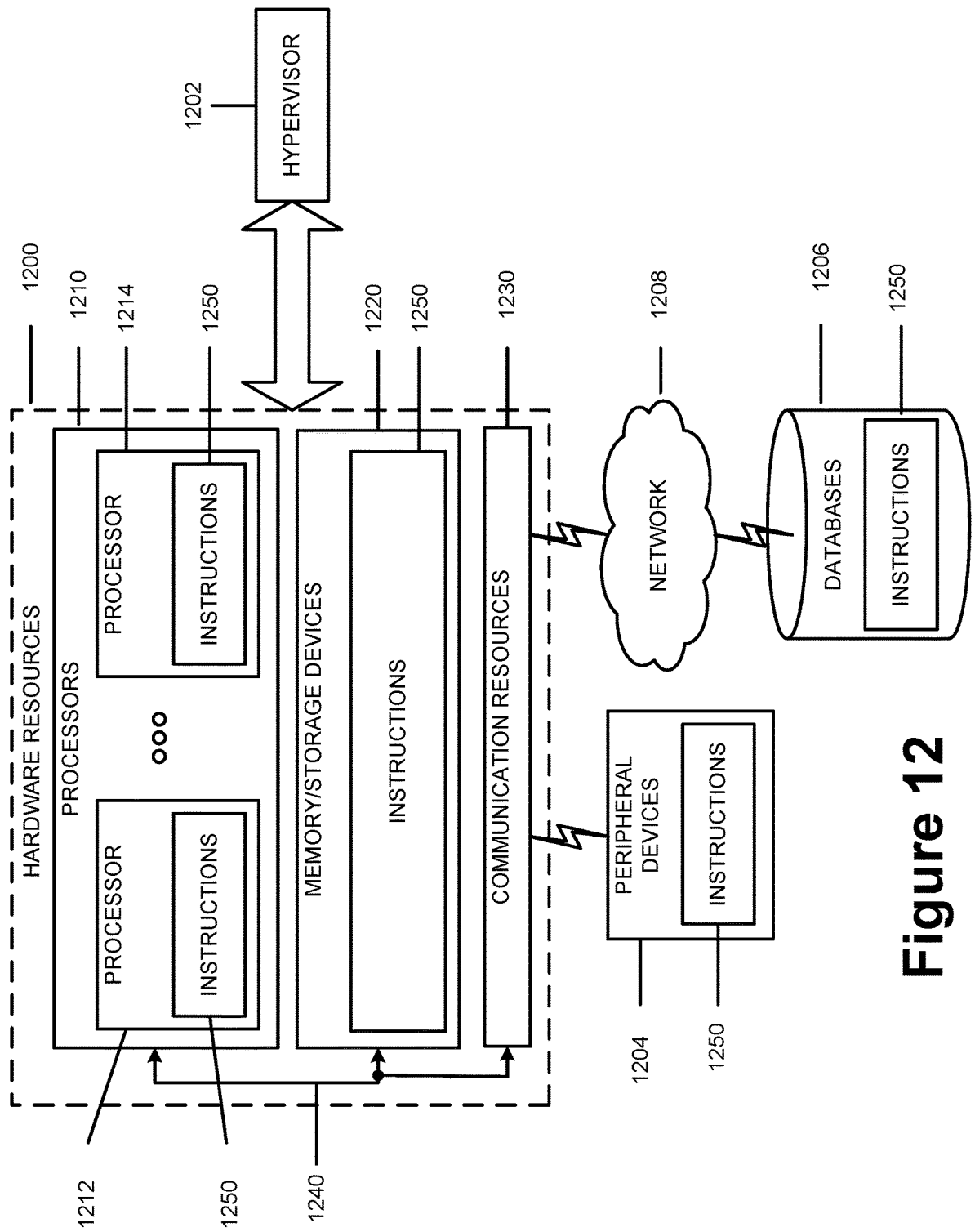
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processor(s) 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via USB), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Example Procedures

Figure 13:
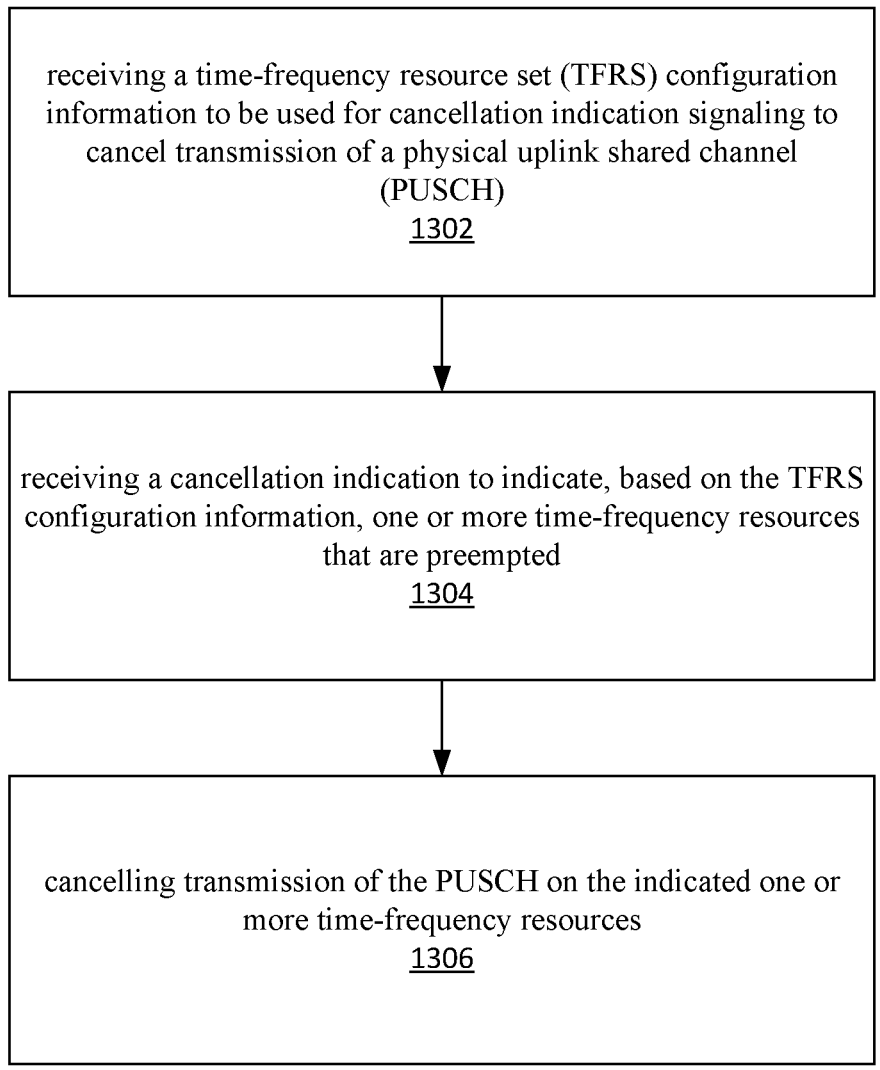
FIG. 13 is a flowchart illustrating an example process of a user equipment in accordance with various embodiments.

In some embodiments, the electronic device(s), network (s), system(s), chip(s) or component(s), or portions or implementations thereof, of FIGS. 8-12, or some other figure herein, may be configured to perform one or more processes, techniques, or methods as described herein, or portions thereof. One such process is depicted in FIG. 13. In some embodiments, the process may be performed by a UE or a portion thereof. For example, the process may include, at 1302, receiving a time-frequency resource set (TFRS) configuration information to be used for cancellation indication signaling to cancel transmission of a physical uplink shared channel (PUSCH). At 1304, the process may further include receiving a cancellation indication to indicate, based on the TFRS configuration information, one or more time-frequency resources that are preempted. At 1306, the process may further include cancelling transmission of the PUSCH on the indicated one or more time-frequency resources.

Figure 14:
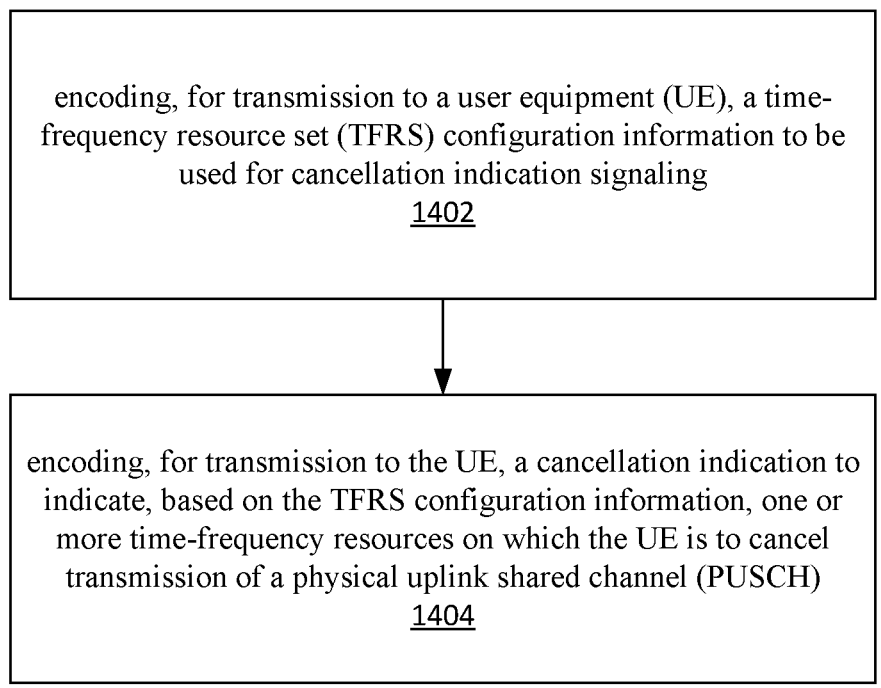
FIG. 14 is a flowchart illustrating an example process of a next generation node B (gNB) in accordance with various embodiments.

FIG. 14 illustrates another process in accordance with various embodiments. In some embodiments, the process may be performed by a gNB or a portion thereof. For example, the process may include, at 1402, encoding, for transmission to a user equipment (UE), a time-frequency resource set (TFRS) configuration information to be used for cancellation indication signaling. At 1404, the process may further include encoding, for transmission to the UE, a cancellation indication to indicate, based on the TFRS configuration information, one or more time-frequency resources on which the UE is to cancel transmission of a physical uplink shared channel (PUSCH).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method comprising: receiving a time-frequency resource set (TFRS) configuration information to be used for cancellation indication signaling to cancel transmission of a physical uplink shared channel (PUSCH); receiving a cancellation indication to indicate, based on the TFRS configuration information, one or more time-frequency resources that are preempted; and cancelling transmission of the PUSCH on the indicated one or more time-frequency resources.

Example 2 may include the method of example 1 or some other example herein, wherein the TFRS configuration information includes one or more of: time-frequency information to define a time-frequency region for the cancellation indication signaling; serving cell information to indicate one or more parameters for cancellation indication in a serving cell; and/or message information to indicate one or more parameters for a downlink control information (DCI) message that includes the cancellation indication.

Example 3 may include the method of example 2 or some other example herein, wherein the time-frequency information includes one or more of: a starting symbol for the time-frequency region; a time duration of the time-frequency region; a time granularity of the time-frequency region; a frequency range of the time-frequency region; and/or a number of frequency partitions in the time-frequency region.

Example 4 may include the method of example 2-3 or some other example herein, wherein the serving cell information includes one or more of: a serving cell ID of the serving cell; a supplementary uplink (SUL) indicator to indicate whether the TFRS configuration information is for an SUL or a normal uplink carrier of the serving cell; and/or a position indicator to indicate a location of a payload of the cancellation indication in an associated DCI.

Example 5 may include the method of example 2-4 or some other example herein, wherein the message information includes one or more of: a radio network temporary identifier (RNTI) to be used for the DCI; and/or a payload size of the DCI.

Example 6 may include the method of example 1-5 or some other example herein, further comprising receiving a method indicator to indicate whether a cancellation indication method to be used is a dynamic method or a semi-static method.

Example 7 may include the method of example 1-6 or some other example herein, wherein the TFRS configuration information includes configuration information for a plurality of time-frequency region (TFR) configurations, and wherein the method further comprises receiving a TFR indicator to indicate one of the TFR configurations that is to be used.

Example 8 may include the method of example 7 or some other example herein, wherein the TFRS configuration information is received via radio resource control (RRC) signaling, and wherein the TFR indicator is received via DCI.

Example 9 may include the method of example 1-6 or some other example herein, wherein the TFRS configuration information is received via RRC signaling and includes configuration information for only one time-frequency region.

Example 10 may include the method of example 1-9 or some other example herein, wherein the method is performed by a user equipment (UE) or a portion thereof.

Example 11 may include a method comprising: receiving, via radio resource control (RRC) signaling, configuration information for a plurality of time-frequency region (TFR) configurations; receiving a TFR indicator to indicate a first TFR configuration, of the plurality of TFR configurations, to be used for processing a cancellation indication; receiving a downlink control information (DCI) that includes the cancellation indication; determining one or more preempted time-frequency resources that are preempted based on the cancellation indication and the first TFR configuration; and cancelling transmission of an uplink signal on the one or more preempted time-frequency resources.

Example 12 may include the method of example 11 or some other example herein, wherein the uplink signal is a physical uplink shared channel (PUSCH).

Example 13 may include the method of example 11-12 or some other example herein, wherein the TFR indicator is included in the DCI.

Example 14 may include the method of example 11-13 or some other example herein, further comprising receiving a medium access control (MAC) control element (CE) to indicate whether individual TFR configurations of the plurality of TFR configurations are activated or deactivated.

Example 15 may include the method of example 14 or some other example herein, wherein only one of the individual TFR configurations is activated at a time.

Example 16 may include the method of example 15 or some other example herein, wherein the TFR indicator is an enablement indicator to indicate that uplink cancellation is to be performed.

Example 17 may include the method of example 14-16 or some other example herein, wherein the MAC CE includes a bitmap with individual bits to indicate whether the corresponding individual TFR configuration is activated or deactivated.

Example 18 may include the method of example 11-17 or some other example herein, wherein the plurality of TFR configurations include one or more of: time-frequency information to define the time-frequency region; serving cell information to indicate one or more parameters for cancellation indication in a serving cell; and/or message information to indicate one or more parameters for the DCI that includes the cancellation indication.

Example 19 may include the method of example 18 or some other example herein, wherein the time-frequency information includes one or more of: a starting symbol for the time-frequency region; a time duration of the time-frequency region; a time granularity of the time-frequency region; a frequency range of the time-frequency region; and/or a number of frequency partitions in the time-frequency region.

Example 20 may include the method of example 18-19 or some other example herein, wherein the serving cell information includes one or more of: a serving cell ID of the serving cell; a supplementary uplink (SUL) indicator to indicate whether the TFRS configuration information is for an SUL or a normal uplink carrier of the serving cell; and/or a position indicator to indicate a location of a payload of the cancellation indication in an associated DCI.

Example 21 may include the method of example 18-20 or some other example herein, wherein the message information includes one or more of: a radio network temporary identifier (RNTI) to be used for the DCI; and/or a payload size of the DCI.

Example 22 may include the method of example 11-21 or some other example herein, wherein the method is performed by a user equipment (UE) or a portion thereof.

Example 23 may include a method comprising: receiving a flag to indicate a bit size of time-frequency region (TFR) field in a downlink control information (DCI) that includes a cancellation indication; receiving the DCI that includes the cancellation indication; determining a time-frequency resource set (TFRS) configuration to use for the cancellation indication based on the TFR field and the flag; and cancelling transmission of a physical uplink shared channel (PUSCH) in one or more time-frequency resources based on the determined TFRS configuration.

Example 24 may include the method of example 23 or some other example herein, wherein the flag indicates that the bit size is one of 0, 1, or 2 bits.

Example 25 may include the method of example 23-24 or some other example herein, wherein the TFRS configuration is determined based on the TFR field according to Table 1 and/or Table 2.

Example 26 may include the method of example 23-25 or some other example herein, wherein the flag is included in the DCI.

Example 27 may include the method of example 23-26 or some other example herein, wherein the method is performed by a user equipment (UE) or a portion thereof.

Example 28 may include a method comprising: encoding, for transmission to a user equipment (UE), a time-frequency resource set (TFRS) configuration information to be used for cancellation indication signaling; and encoding, for transmission to the UE, a cancellation indication to indicate, based on the TFRS configuration information, one or more time-frequency resources on which the UE is to cancel transmission of a physical uplink shared channel (PUSCH).

Example 29 may include the method of example 28 or some other example herein, wherein the TFRS configuration information includes one or more of: time-frequency information to define a time-frequency region for the cancellation indication signaling; serving cell information to indicate one or more parameters for cancellation indication in a serving cell; and/or message information to indicate one or more parameters for a downlink control information (DCI) message that includes the cancellation indication.

Example 30 may include the method of example 29 or some other example herein, wherein the time-frequency information includes one or more of: a starting symbol for the time-frequency region; a time duration of the time-frequency region; a time granularity of the time-frequency region; a frequency range of the time-frequency region; and/or a number of frequency partitions in the time-frequency region.

Example 31 may include the method of example 29-30 or some other example herein, wherein the serving cell information includes one or more of: a serving cell ID of the serving cell; a supplementary uplink (SUL) indicator to indicate whether the TFRS configuration information is for an SUL or a normal uplink carrier of the serving cell; and/or a position indicator to indicate a location of a payload of the cancellation indication in an associated DCI.

Example 32 may include the method of example 29-31 or some other example herein, wherein the message information includes one or more of: a radio network temporary identifier (RNTI) to be used for the DCI; and/or a payload size of the DCI.

Example 33 may include the method of example 28-32 or some other example herein, further comprising encoding, for transmission to the UE, a method indicator to indicate whether a cancellation indication method to be used is a dynamic method or a semi-static method.

Example 34 may include the method of example 28-33 or some other example herein, wherein the TFRS configuration information includes configuration information for a plurality of time-frequency region (TFR) configurations, and wherein the method further comprises receiving a TFR indicator to indicate one of the TFR configurations that is to be used.

Example 35 may include the method of example 34 or some other example herein, wherein the TFRS configuration information is received via radio resource control (RRC) signaling, and wherein the TFR indicator is received via DCI.

Example 36 may include the method of example 28-35 or some other example herein, wherein the TFRS configuration information is received via RRC signaling and includes configuration information for only one time-frequency region.

Example 37 may include the method of example 28-36 or some other example herein, wherein the UE is a first UE, and wherein the method further comprises determining that a second UE is to perform an uplink transmission in the one or more time-frequency resources, wherein the cancellation indication is transmitted based on the determination.

Example 38 may include the method of example 28-37 or some other example herein, wherein the method is performed by a next generation NodeB (gNB) or a portion thereof.

Example 39 may include a method comprising: encoding, for transmission to a user equipment (UE) via radio resource control (RRC) signaling, configuration information for a plurality of time-frequency region (TFR) configurations; encoding, for transmission to the UE, a TFR indicator to indicate a first TFR configuration, of the plurality of TFR configurations, to be used for processing a cancellation indication; and encoding, for transmission to the UE, a downlink control information (DCI) that includes the cancellation indication to indicate one or more time-frequency resources on which an uplink transmission by the UE is to be cancelled.

Example 40 may include the method of example 39 or some other example herein, wherein the uplink transmission is a physical uplink shared channel (PUSCH).

Example 41 may include the method of example 39-40 or some other example herein, wherein the TFR indicator is included in the DCI.

Example 42 may include the method of example 39-41 or some other example herein, further comprising encoding, for transmission to the UE, a medium access control (MAC) control element (CE) to indicate whether individual TFR configurations of the plurality of TFR configurations are activated or deactivated.

Example 43 may include the method of example 42 or some other example herein, wherein only one of the individual TFR configurations is activated at a time.

Example 44 may include the method of example 43 or some other example herein, wherein the TFR indicator is an enablement indicator to indicate that uplink cancellation is to be performed.

Example 45 may include the method of example 42-44 or some other example herein, wherein the MAC CE includes a bitmap with individual bits to indicate whether the corresponding individual TFR configuration is activated or deactivated.

Example 46 may include the method of example 39-45 or some other example herein, wherein the plurality of TFR configurations include one or more of: time-frequency information to define the time-frequency region; serving cell information to indicate one or more parameters for cancellation indication in a serving cell; and/or message information to indicate one or more parameters for the DCI that includes the cancellation indication.

Example 47 may include the method of example 46 or some other example herein, wherein the time-frequency information includes one or more of: a starting symbol for the time-frequency region; a time duration of the time-frequency region; a time granularity of the time-frequency region; a frequency range of the time-frequency region; and/or a number of frequency partitions in the time-frequency region.

Example 48 may include the method of example 46-47 or some other example herein, wherein the serving cell information includes one or more of: a serving cell ID of the serving cell; a supplementary uplink (SUL) indicator to indicate whether the TFRS configuration information is for an SUL or a normal uplink carrier of the serving cell; and/or a position indicator to indicate a location of a payload of the cancellation indication in an associated DCI.

Example 49 may include the method of example 46-48 or some other example herein, wherein the message information includes one or more of: a radio network temporary identifier (RNTI) to be used for the DCI; and/or a payload size of the DCI.

Example 50 may include the method of example 39-49 or some other example herein, wherein the method is performed by a next generation NodeB (gNB) or a portion thereof.

Example 51 may include a method comprising: encoding, for transmission to a user equipment (UE) a flag to indicate a bit size of time-frequency region (TFR) field in a downlink control information (DCI) that includes a cancellation indication; and encoding, for transmission to the UE, the DCI that includes the cancellation indication, the DCI to indicate a time-frequency resource set (TFRS) configuration to use for the cancellation indication based on the TFR field and the flag, and the cancellation indication to indicate one or more time-frequency resources that are preempted from being used for an uplink transmission by the UE.

Example 52 may include the method of example 51 or some other example herein, wherein the flag indicates that the bit size is one of 0, 1, or 2 bits.

Example 53 may include the method of example 51-52 or some other example herein, wherein the TFR field is to indicate the TFRS configuration according to Table 1 and/or Table 2.

Example 54 may include the method of example 51-53 or some other example herein, wherein the flag is included in the DCI.

Example 55 may include the method of example 51-54 or some other example herein, wherein the method is performed by a next generation NodeB (gNB) or a portion thereof.

Example 56 may include a method comprising: receiving a cancellation indication including a first resource indicator value (MV) to indicate a time component of a time-frequency resource and a second MV to indicate a frequency component of the time-frequency resource; and cancelling a transmission in the time-frequency resource based on the cancellation indication.

Example 57 may include the method of example 56 or some other example herein, wherein the first RIV is a single number to indicate a starting position and length of the time component.

Example 58 may include the method of example 56-57 or some other example herein, wherein the second MV is a single number to indicate a starting position and bandwidth of the frequency component.

Example 59 may include the method of example 56-58 or some other example herein, wherein the method is performed by a user equipment (UE) or a portion thereof.

Example 60 may include a method comprising: receiving configuration information for a plurality of payload construction methods (PCMs) for cancellation indication signaling; receiving an indicator to indicate one of the plurality of PCMs to use for a cancellation indication message; and processing a payload of the cancellation indication message based on the indicated PCM.

Example 61 may include the method of example 60 or some other example herein, wherein the configuration information is received via radio resource control (RRC) signaling.

Example 62 may include the method of example 60-61 or some other example herein, wherein the indicator is received in a MAC control element (CE).

Example 63 may include the method of example 60-62 or some other example herein, further comprising receiving a MAC CE to indicate a subset of the PCMs that are available for use, wherein the indicator indicates one of the available PCMs.

Example 64 may include the method of example 60-63 or some other example herein, wherein the indicator is included in a downlink control information (DCI).

Example 65 may include the method of example 60-64 or some other example herein, wherein the indicator is included in the cancellation indication message.

Example 66 may include the method of example 60-65 or some other example herein, wherein the processing includes determining, based on the payload and the indicated PCM, a time-frequency resource on which a transmission is to be cancelled.

Example 67 may include the method of example 66 or some other example herein, further comprising cancelling the transmission on the determined time-frequency resource.

Example 68 may include the method of example 60-67 or some other example herein, wherein the method is performed by a user equipment (UE) or a portion thereof.

Example 69 may include a method comprising: scheduling a first uplink transmission by a first UE; determining that a second uplink transmission to be transmitted by a second UE overlaps with the first uplink transmission on a time-frequency resource; encoding, for transmission to the first UE, a cancellation indication message to instruct the first UE to cancel the first uplink transmission on the time-frequency resource, wherein the cancellation indication message includes a first resource indicator value (RIV) to indicate a time component of the time-frequency resource and a second MV to indicate a frequency component of the time-frequency resource.

Example 70 may include the method of example 69 or some other example herein, wherein the first RIV is a single number to indicate a starting position and length of the time component.

Example 71 may include the method of example 69-70 or some other example herein, wherein the second MV is a single number to indicate a starting position and bandwidth of the frequency component.

Example 72 may include the method of example 69-71 or some other example herein, wherein the method is performed by a next generation Node B (gNB) or a portion thereof.

Example 73 may include a method comprising: encoding, for transmission to a UE, configuration information for a plurality of payload construction methods (PCMs) for cancellation indication signaling; encoding, for transmission to the UE, an indicator to indicate one of the plurality of PCMs to use for a cancellation indication message; and encoding, for transmission to the UE, a payload of the cancellation indication message based on the indicated PCM.

Example 74 may include the method of example 73 or some other example herein, wherein the configuration information is transmitted via radio resource control (RRC) signaling.

Example 75 may include the method of example 73-74 or some other example herein, wherein the indicator is received in a MAC control element (CE).

Example 76 may include the method of example 73-75 or some other example herein, further comprising encoding, for transmission to the UE, a MAC CE to indicate a subset of the PCMs that are available for use, wherein the indicator indicates one of the available PCMs.

Example 77 may include the method of example 73-76 or some other example herein, wherein the indicator is included in a downlink control information (DCI).

Example 78 may include the method of example 73-76 or some other example herein, wherein the indicator is included in the cancellation indication message.

Example 79 may include the method of example 73-78 or some other example herein, wherein the payload is to indicate a time-frequency resource on which a transmission by the UE is to be cancelled.

Example 80 may include the method of example 73-79 or some other example herein, wherein the method is performed by a next generation Node B (gNB) or a portion thereof.

Example 81 may include an apparatus comprising means to perform one or more elements of a method described in or related to any of examples 1-80, or any other method or process described herein.

Example 82 may include one or more non-transitory computer-readable media comprising instructions to cause an electronic device, upon execution of the instructions by one or more processors of the electronic device, to perform one or more elements of a method described in or related to any of examples 1-80, or any other method or process described herein.

Example 83 may include an apparatus comprising logic, modules, or circuitry to perform one or more elements of a method described in or related to any of examples 1-80, or any other method or process described herein.

Example 84 may include a method, technique, or process as described in or related to any of examples 1-80, or portions or parts thereof.

Example 85 may include an apparatus comprising: one or more processors and one or more computer-readable media comprising instructions that, when executed by the one or more processors, cause the one or more processors to perform the method, techniques, or process as described in or related to any of examples 1-80, or portions thereof.

Example 86 may include a signal as described in or related to any of examples 1-80, or portions or parts thereof.

Example 87 may include a datagram, packet, frame, segment, protocol data unit (PDU), or message as described in or related to any of examples 1-80, or portions or parts thereof, or otherwise described in the present disclosure.

Example 88 may include a signal encoded with data as described in or related to any of examples 1-80, or portions or parts thereof, or otherwise described in the present disclosure.

Example 89 may include a signal encoded with a datagram, packet, frame, segment, protocol data unit (PDU), or message as described in or related to any of examples 1-80, or portions or parts thereof, or otherwise described in the present disclosure.

Example 90 may include an electromagnetic signal carrying computer-readable instructions, wherein execution of the computer-readable instructions by one or more processors is to cause the one or more processors to perform the method, techniques, or process as described in or related to any of examples 1-80, or portions thereof.

Example 91 may include a computer program comprising instructions, wherein execution of the program by a processing element is to cause the processing element to carry out the method, techniques, or process as described in or related to any of examples 1-80, or portions thereof.

Example 92 may include a signal in a wireless network as shown and described herein.

Example 93 may include a method of communicating in a wireless network as shown and described herein.

Example 94 may include a system for providing wireless communication as shown and described herein.

Example 95 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |

-continued

| | |
|---|---|
| CCE | Control Channel Element |
| CCCH | Common Control Channel |
| CE | Coverage Enhancement |
| CDM | Content Delivery Network |
| CDMA | Code Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |

| | |
|---|---|
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, Multimedia |
| IP | Multimedia |
| IMC | IMS Credentials |
| IMEI | International Mobile Equipment Identity |
| IMGI | International mobile group identity |
| IMPI IP | Multimedia Private Identity |
| IMPU IP | Multimedia PUblic identity |
| IMS IP | Multimedia Subsystem |
| IMSI | International Mobile Subscriber Identity |
| IoT | Internet of Things |
| IP | Internet Protocol |
| | Ipsec IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |

| | |
|---|---|
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications mMTCmassive MTC, massive Machine-Type Communications |
| MU-MIMO | Multi User MIMO |
| MWUS MTC | wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature(Quaternary) Phase Shift Keying |
| QZSS | Quasi-Zenith Satellite System |
| RA-RNTI | Random Access RNTI |

| | | |
|---|---|---|
| RAB | Radio Access Bearer, Random Access Burst | |
| RACH | Random Access Channel | |
| RADIUS | Remote Authentication Dial In User Service | |
| RAN | Radio Access Network | |
| RAND | RANDom number(used for authentication) | |
| RAR | Random Access Response | |
| RAT | Radio Access Technology | |
| RAU | Routing Area Update | |
| RB | Resource block, Radio Bearer | |
| RBG | Resource block group | |
| REG | Resource Element Group | |
| Rel | Release | |
| REQ | REQuest | |
| RF | Radio Frequency | |
| RI | Rank Indicator | |
| RIV | Resource indicator value | |
| RL | Radio Link | |
| RLC | Radio Link Control, Radio Link Control layer | |
| RLC AM | RLC Acknowledged Mode | |
| RLC UM | RLC Unacknowledged Mode | |
| RLF | Radio Link Failure | |
| RLM | Radio Link Monitoring | |
| RLM-RS | Reference Signal for RLM | |
| RM | Registration Management | |
| RMC | Reference Measurement Channel | |
| RMSI | Remaining MSI, Remaining Minimum System Information | |
| RN | Relay Node | |
| RNC | Radio Network Controller | |
| RNL | Radio Network Layer | |
| RNTI | Radio Network Temporary Identifier | |
| ROHC | RObust Header Compression | |
| RRC | Radio Resource Control, Radio Resource Control layer | |
| RRM | Radio Resource Management | |
| RS | Reference Signal | |
| RSRP | Reference Signal Received Power | |
| RSRQ | Reference Signal Received Quality | |
| RSSI | Received Signal Strength Indicator | |
| RSU | Road Side Unit | |
| RSTD | Reference Signal Time difference | |
| RTP | Real Time Protocol | |
| RTS | Ready-To-Send | |
| RTT | Round Trip Time | |
| | Rx Reception, Receiving, Receiver | |
| S1AP | S1 Application Protocol | |
| S1-MME | S1 for the control plane | |
| S1-U | S1 for the user plane | |
| S-GW | Serving Gateway | |
| S-RNTI | SRNC Radio Network Temporary Identity | |
| S-TMSI | SAE Temporary Mobile Station Identifier | |
| SA | Standalone operation mode | |
| SAE | System Architecture Evolution | |
| SAP | Service Access Point | |
| SAPD | Service Access Point Descriptor | |
| SAPI | Service Access Point Identifier | |
| SCC | Secondary Component Carrier, Secondary CC | |
| SCell | Secondary Cell | |
| SC-FDMA | Single Carrier Frequency Division Multiple Access | |
| SCG | Secondary Cell Group | |
| SCM | Security Context Management | |
| SCS | Subcarrier Spacing | |
| SCTP | Stream Control Transmission Protocol | |
| SDAP | Service Data Adaptation Protocol, Service Data Adaptation Protocol layer | |
| SDL | Supplementary Downlink | |
| SDNF | Structured Data Storage Network Function | |
| SDP | Session Description Protocol | |
| SDSF | Structured Data Storage Function | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |
| SRB | Signalling Radio Bearer | |
| SRS | Sounding Reference Signal | |
| SS | Synchronization Signal | |
| SSB | Synchronization Signal Block, SS/PBCH Block | |
| SSBRI | SS/PBCH Block Resource Indicator, Synchronization Signal Block Resource Indicator | |
| SSC | Session and Service Continuity | |
| SS-RSRP | Synchronization Signal based Reference Signal Received Power | |
| SS-RSRQ | Synchronization Signal based Reference Signal Received Quality | |
| SS-SINR | Synchronization Signal based Signal to Noise and Interference Ratio | |
| SSS | Secondary Synchronization Signal | |
| SSSG | Search Space Set Group | |
| SSSIF | Search Space Set Indicator | |
| SST | Slice/Service Types | |
| SU-MIMO | Single User MIMO | |
| SUL | Supplementary Uplink | |
| TA | Timing Advance, Tracking Area | |
| TAC | Tracking Area Code | |
| TAG | Timing Advance Group | |
| TAU | Tracking Area Update | |
| TB | Transport Block | |
| TBS | Transport Block Size | |
| TBD | To Be Defined | |
| TCI | Transmission Configuration Indicator | |
| TCP | Transmission Communication Protocol | |
| TDD | Time Division Duplex | |
| TDM | Time Division Multiplexing | |
| TDMA | Time Division Multiple Access | |
| TE | Terminal Equipment | |
| TEID | Tunnel End Point Identifier | |
| TFT | Traffic Flow Template | |
| TMSI | Temporary Mobile Subscriber Identity | |
| TNL | Transport Network Layer | |
| TPC | Transmit Power Control | |
| TPMI | Transmitted Precoding Matrix Indicator | |
| TR | Technical Report | |
| TRP, TRxP | Transmission Reception Point | |
| TRS | Tracking Reference Signal | |
| TRx | Transceiver | |
| TS | Technical Specifications, Technical Standard | |
| TTI | Transmission Time Interval | |
| | Tx Transmission, Transmitting, Transmitter | |
| U-RNTI | UTRAN Radio Network Temporary Identity | |
| UART | Universal Asynchronous Receiver and Transmitter | |
| UCI | Uplink Control Information | |
| UE | User Equipment | |
| UDM | Unified Data Management | |
| UDP | User Datagram Protocol | |
| UDSF | Unstructured Data Storage Network Function | |
| UICC | Universal Integrated Circuit Card | |
| UL | Uplink | |
| UM | Unacknowledged Mode | |

| | |
|---|---|
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra- Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed by one or more processors cause a user equipment (UE) to:
   receive a radio resource control (RRC) message that includes time-frequency resource set (TFRS) configuration information to be used for cancellation indication signaling to cancel transmission of a physical uplink shared channel (PUSCH);
   receive a cancellation indication to indicate, based on the TFRS configuration information, one or more time-frequency resources that are preempted; and
   cancel transmission of the PUSCH on the indicated one or more time-frequency resources.

2. The one or more NTCRM of claim 1, wherein the TFRS configuration information includes:
   time-frequency information to define a time-frequency region for the cancellation indication signaling;
   serving cell information to indicate one or more parameters for cancellation indication in a serving cell; and
   message information to indicate one or more parameters for a downlink control information (DCI) message that includes the cancellation indication.

3. The one or more NTCRM of claim 2, wherein the time-frequency information includes one or more of:
   a starting symbol for the time-frequency region;
   a time duration of the time-frequency region;
   a time granularity of the time-frequency region;
   a frequency range of the time-frequency region; or
   a number of frequency partitions in the time-frequency region.

4. The one or more NTCRM of claim 2, wherein the serving cell information includes one or more of:
   a serving cell ID of the serving cell;
   a supplementary uplink (SUL) indicator to indicate whether the TFRS configuration information is for an SUL or a normal uplink carrier of the serving cell; or
   a position indicator to indicate a location of a payload of the cancellation indication in an associated DCI.

5. The one or more NTCRM of claim 2, wherein the message information includes: a radio network temporary identifier (RNTI) to be used for the DCI; and a payload size of the DCI.

6. The one or more NTCRM of claim 1, wherein the instructions, when executed, further cause the UE to receive a method indicator to indicate whether a cancellation indication method to be used is a dynamic method or a semi-static method.

7. The one or more NTCRM of claim 1, wherein the TFRS configuration information includes configuration information for a plurality of time-frequency region (TFR) configurations, and wherein the instructions, when executed, further cause the UE to receive a TFR indicator to indicate one of the TFR configurations that is to be used.

8. The one or more NTCRM of claim 7, wherein the TFR indicator is received via a downlink control information (DCI).

9. The one or more NTCRM of claim 1, wherein the TFRS configuration information includes configuration information for only one time-frequency region.

10. One or more non-transitory, computer-readable media (NTCRM) having instructions, stored thereon, that when executed by one or more processors cause a next generation Node B (gNB) to:
- encode, for transmission to a user equipment (UE), a radio resource control (RRC) message to indicate time-frequency resource set (TFRS) configuration information to be used for cancellation indication signaling; and
- encode, for transmission to the UE, a cancellation indication to indicate, based on the TFRS configuration information, one or more time-frequency resources on which the UE is to cancel transmission of a physical uplink shared channel (PUSCH).

11. The one or more NTCRM of claim 10, wherein the TFRS configuration information includes:
- time-frequency information to define a time-frequency region for the cancellation indication signaling;
- serving cell information to indicate one or more parameters for cancellation indication in a serving cell; and
- message information to indicate one or more parameters for a downlink control information (DCI) message that includes the cancellation indication.

12. The one or more NTCRM of claim 11, wherein the time-frequency information includes one or more of:
- a starting symbol for the time-frequency region;
- a time duration of the time-frequency region;
- a time granularity of the time-frequency region; a frequency range of the time-frequency region; or
- a number of frequency partitions in the time-frequency region.

13. The one or more NTCRM of claim 11, wherein the serving cell information includes one or more of:
- a serving cell ID of the serving cell;
- a supplementary uplink (SUL) indicator to indicate whether the TFRS configuration information is for an SUL or a normal uplink carrier of the serving cell; or
- a position indicator to indicate a location of a payload of the cancellation indication in an associated DCI.

14. The one or more NTCRM of claim 11, wherein the message information includes:
- a radio network temporary identifier (RNTI) to be used for the DCI; and
- a payload size of the DCI.

15. The one or more NTCRM of claim 10, wherein the instructions, when executed, further cause the gNB to encode, for transmission to the UE, a method indicator to indicate whether a cancellation indication method to be used is a dynamic method or a semi-static method.

16. The one or more NTCRM of claim 10, wherein the TFRS configuration information includes configuration information for a plurality of time-frequency region (TFR) configurations, and wherein the instructions, when executed, further cause the gNB to receive a TFR indicator to indicate one of the TFR configurations that is to be used.

17. The one or more NTCRM of claim 16, wherein the TFR indicator is transmitted via a downlink control information (DCI).

18. The one or more NTCRM of claim 10, wherein the TFRS configuration information includes configuration information for only one time-frequency region.

19. The one or more NTCRM of claim 10, wherein the UE is a first UE, and wherein the instructions, when executed, further cause the gNB to determine that a second UE is to perform an uplink transmission in the one or more time-frequency resources, wherein the cancellation indication is transmitted based on the determination.

* * * * *